US012715452B1

(12) United States Patent
Schleede

(10) Patent No.: US 12,715,452 B1
(45) Date of Patent: Aug. 25, 2026

(54) TRAINING AND EXECUTING NAVIGATION MODELS FOR AUTONOMOUS VEHICLES

(71) Applicant: Zoox, Inc., Foster City, CA (US)

(72) Inventor: Peter Scott Schleede, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 365 days.

(21) Appl. No.: 17/732,236

(22) Filed: Apr. 28, 2022

(51) Int. Cl.
*B60W 50/00* (2006.01)
*B60W 60/00* (2020.01)
*G05B 13/02* (2006.01)

(52) U.S. Cl.
CPC .... *B60W 50/0098* (2013.01); *B60W 60/0015* (2020.02); *G05B 13/0265* (2013.01); *B60W 2050/0028* (2013.01)

(58) Field of Classification Search
None
See application file for complete search history.

(56) References Cited

U.S. PATENT DOCUMENTS 9,008,423 B2 * 4/2015 Cho ..................... G06V 20/52 382/168
11,790,230 B2 * 10/2023 Yang ................ G06F 18/23213
11,808,590 B2 * 11/2023 Rus ..................... G01C 21/28
11,966,838 B2 * 4/2024 Muller ................ G01S 17/931
2007/0046677 A1 * 3/2007 Hong ................. G05B 19/41 345/442
2021/0064065 A1 * 3/2021 Chen .................. G05D 1/102
2022/0404829 A1 * 12/2022 Nister ............... G05D 1/0212

* cited by examiner

*Primary Examiner* — Angela Y Ortiz
*Assistant Examiner* — Torrence S Marunda, II
(74) *Attorney, Agent, or Firm* — Lee & Hayes, P.C.

(57) ABSTRACT

Techniques are discussed herein for training and executing movement and navigation models for controlling autonomous vehicles in simulations and/or in real-world physical environments. In some examples, a model training component may receive object movement data, such as velocities and/or steering angles, from vehicle logs or other ground truth data sources. The movement data may be discretized into labeled bins, and a smoothing function (e.g., a Gaussian quadrature or other weight sum function) centered on the ground truth data may be applied to the labeled bins. During model training, the model outputs can be compared to the smoothed object movement data using a loss function (e.g., a cross-entropy loss function), to reduce the magnitude of the loss penalties for incorrect predictions that are closer to the ground truth data. As a result, models trained using the techniques described herein may provide improved object movement predictions and/or navigation performance for controlling autonomous vehicles.

20 Claims, 8 Drawing Sheets

600

TRAINING AND EXECUTING NAVIGATION MODELS FOR AUTONOMOUS VEHICLES

BACKGROUND

Vehicles are increasingly supplementing or replacing manual functionality with automatic controls. Autonomous driving may benefit from computing systems capable of making split-second decisions to respond to myriad events and scenarios, including vehicle reactions to dynamic objects operating in an environment of the vehicle. Simulations can be used to test and validate the features and functionalities of vehicle control systems, including those that may be otherwise prohibitive to test in real-world environments for example, due to safety concerns, limitations on time, repeatability, etc. For example, autonomous vehicles may use driving simulations to test and improve the performance of the vehicle control systems with respect to passenger safety, vehicle decision-making, sensor data analysis, route optimization, and the like. However, driving simulations that accurately reflect real-world scenarios may be difficult and expensive to create and execute, as the data used to create such simulations may be noisy, inconsistent, or incomplete. Additionally, execution of driving simulations may involve executing multiple different interacting systems and components, including the vehicle control systems being evaluated, as well as agents and other objects in the simulated environment, which may be resource and computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
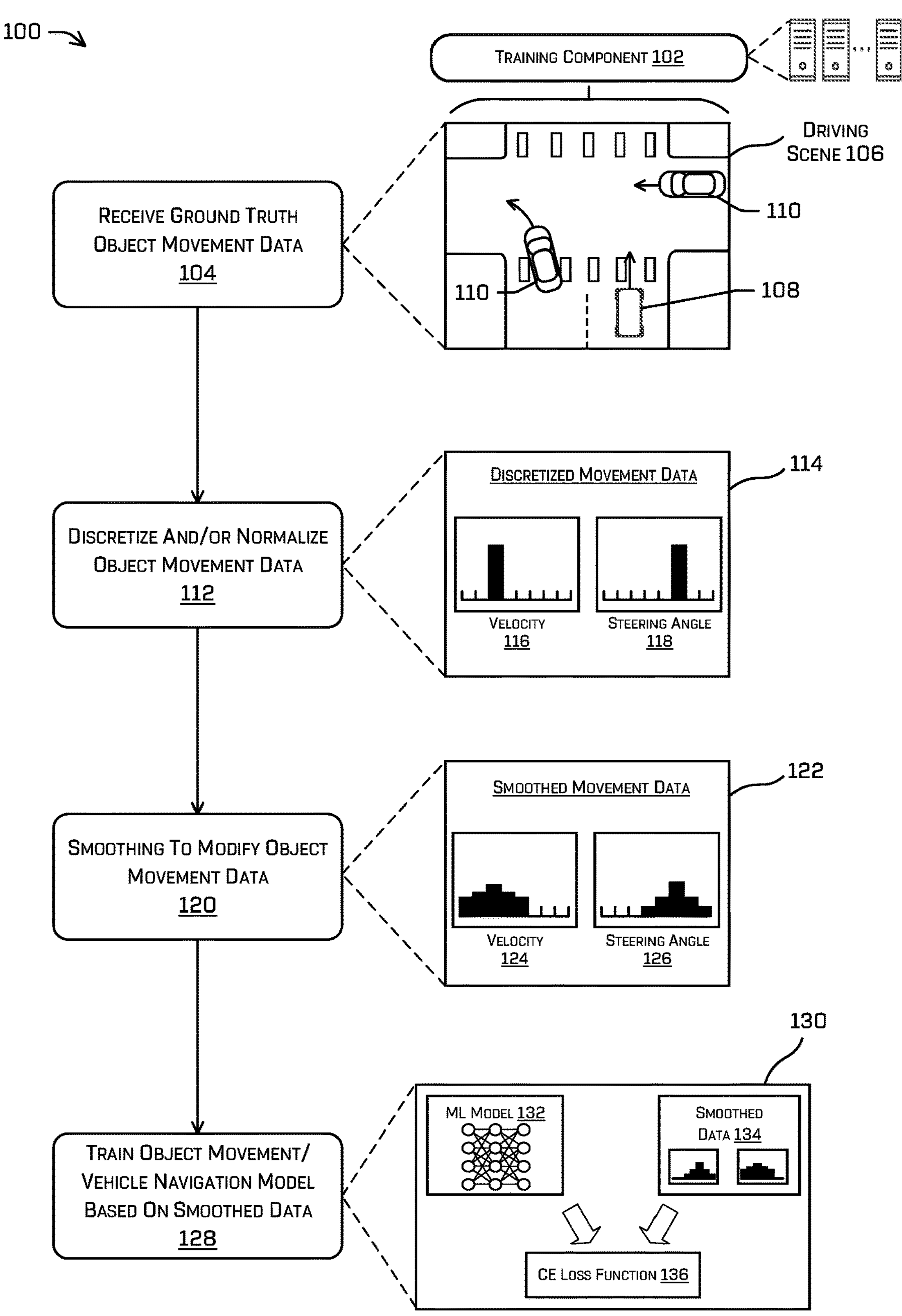
FIG. 1 illustrates an example technique of training a machine learning model configured to control the movement and/or navigation of an autonomous vehicle, in accordance with one or more implementations of the disclosure.

This application relates to training and executing machine learning models for controlling the movement and/or navigation of autonomous vehicles. The trained models described herein may be used to control simulated vehicles in driving simulations and/or autonomous vehicles operating in real-world physical environments. In some examples, a model training component may receive ground truth object movement data (e.g., velocities, accelerations, steering angles, vehicle poses, etc.) as values within a continuous range of values. A training component may discretize and/or normalize the ground truth object movement data, and may store the data in labeled bins. In some examples, the model training component may use a one-hot encoding scheme (e.g., a vector comprising only "0" and a single "1" as components) and may store representations of the ground truth object movement data in binary vectors. Binary vectors generated using one-hot encoding may be provided as input during both training and execution operations of an object movement and/or navigation model.

During training of an object movement and/or vehicle navigation model, the ground truth data may be provided as input data to the model. Additionally, the training component may use a smoothing function to generate modified (e.g., smoothed) data based on the ground truth data. In some examples, the training component may use a set of values based on the weights of a Gaussian quadrature function or other weight sum function, to generate a non-binary (e.g., continuous valued) smoothed vector representing a smoothed distribution of the discretized ground truth data. The set of values determined based on the smoothing function may be centered on the location (e.g., the vector component) representing the ground truth data in the binary vector, and the values in the smoothed vector may decrease in magnitude in both directions from that vector component location. When using a loss function to evaluate the performance of the model, the training component may compare the smoothed data to the model output associated with the ground truth data. In some examples, a cross-entropy loss function may be used to compare the probability distribution output by the model to the vector of smoothed data generated using the smoothing function. As described below in more detail, by smoothing the discretized ground truth data using the techniques described herein, the loss penalties for incorrect predictions that are closer to the ground truth data may be reduced in magnitude. As a result, machine learning models trained using these techniques may provide improved performance for controlling movements and navigation of vehicles and other objects during simulations and/or real-world driving environments.

In some examples, object movement models (e.g., vehicle or object movement models, vehicle or object navigation models, motion planning models, etc.) trained using the techniques described herein can be used to control simulated objects within driving simulations. Driving simulations may be used to test and validate features and functionalities of autonomous vehicles that may be otherwise prohibitive to test in the real world (e.g., due to safety concerns, limitations on time, repeatability, cost, etc.). For example, autonomous vehicles and other moving vehicles may use driving simulations to test and improve passenger safety, vehicle decision-making, sensor data analysis, and route optimization.

In these examples, a simulation system may generate and execute driving simulations that may include log-based simulations and/or synthetic simulations. For log-based driving simulations, the scenarios upon which the simulations are generated may be based on driving log data captured in real-world physical environments. For instance, a simulation system may generate log-based simulations utilizing techniques such as those described in U.S. patent application Ser. No. 16/376,842, filed Apr. 5, 2019 and entitled "Simulating Autonomous Driving Using Map Data and Driving Data," U.S. patent application Ser. No. 16/555,988, filed Aug. 29, 2019 and entitled "Vehicle Controller Simulations," U.S. patent application Ser. No. 17/184,128, filed Feb. 24, 2021 and entitled "Agent Conversions in Driving Simulations," U.S. patent application Ser. No. 17/184,169, filed Feb. 24, 2021 and entitled "Simulating Agents based on Driving Log Data," the entire contents of which are incorporated herein by reference for all purposes. In other examples, driving simulations may be generated based on synthetic scenarios created, ab initio, programmatically rather than based on log data from physical environments.

For log-based driving scenarios and/or synthetic scenarios, a simulation system may generate a driving simulation by determining and programmatically simulating a number of static and/or dynamic objects (e.g., agents) within the environment of the simulated driving scenario, along with the various attributes and behaviors of the simulated objects. A simulated environment of a driving simulation can include any number of dynamic agents that interact with the environment and with other dynamic agents during the simulation. A "playback agent" may refer to an agent that operates based on log data captured by associated with corresponding agents observed in a real-world (e.g., non-simulated or physical) environment. For example, a real (e.g., non-simulated) vehicle traversing an environment may store log data collected by sensors and/or perception systems of the vehicle, including log data representing agents and other objects observed by the vehicle, such as other vehicles, bicycles, pedestrians, etc. A simulation system may generate and execute simulations in which playback agents are generated within the simulation to correspond to the agents observed in the real-world environment. Each playback agent may be based on a corresponding agent represented in the log data, and may operate in the simulation in a similar or identical manner to the corresponding agent observed in the real-world environment.

In contrast to playback agents, "smart agents" may refer to agents in a simulation that may be controlled autonomously (or semi-autonomously) by an object controller instead of by log data. Unlike playback agents, a smart agent in a simulation may react to the simulated environment and make on-the-fly operating decisions that deviate from the predetermined behaviors of playback agents. Because the behaviors of agents and other static or dynamic objects in an environment may be scenario dependent, the driving log data indicating the behavior of a particular agent (e.g., a vehicle, bicycle, pedestrian, animal, etc.) in one scenario may not be representative of how the agent would behave in a similar scenario. For example, even a minor change to a real-world driving environment or the objects in the environment may result in a significant change to the driving route and/or behaviors of an agent traversing the environment. Therefore, playback agents may be insufficient or incomplete for simulating realistic agent behaviors during driving simulations, and for analyzing vehicle control systems based on those simulations.

Object controllers may use components and/or machine learning (ML) models configured to control simulated objects (e.g., smart agents) during a simulation. In some examples, the ML models described herein may include object movement and/or vehicle navigation models that control the motion of a smart agent during a simulation. However, in other examples, ML models described herein may be trained to control any aspect of agent behavior (e.g., route planning decisions, use of vehicle controls and signals, etc.). In some examples, ML models used to control smart agents in driving simulations may be trained based on ground truth data received from the logs of vehicles operating in real-world physical driving environments. For example, an object movement ML model may be trained using input data including the entire current state of a vehicle performing the movement, the perceived object data and attributes of any other agents or static objects in the environment (e.g., object classifications, locations, poses, velocities, accelerations, etc.), the attributes of the driving environment itself (e.g., map data, road network data, weather and driving conditions, etc.), and the destination or route that the vehicle intends to follow within the environment. Based on the model inputs, an ML model may be trained to output movement predictions for the vehicle at the next time step, such as a predicted velocity, predicted acceleration predicted steering angle, etc., and/or any other vehicle control decision or behavior.

Vehicle movement ML models may be implemented as deep learning models, such as convolutional neural networks (CNNs) or recurrent neural networks (RNNs), and/or using any other type of artificial neural network or machine learning technology. In some examples, the inputs to the object movement ML model may include labeling (or encoding) of continuous movement values such as x-direction velocity, y-direction velocity, x-direction acceleration, y-direction acceleration, steering angle, etc. For instance, the continuous velocity, acceleration, and/or steering angle values may be converted into labels using one-hot encoding (or other encoding scheme). To convert continuous object movement data (e.g., velocity or steering angle data) into one-hot labels, the object movement data may be clipped between minimum and maximum values and subdivided into a number of labeled bins corresponding to value ranges within the continuous. As an example, the observed velocity data for a vehicle (or multiple vehicles) over a time and/or driving distance range may be clipped between the minimum and maximum velocity values, normalized (e.g., to [0, 1]), and the subdivided (or split) into a number of labeled bins so that each bin corresponds to a range of velocities. When a vehicle velocity value is received, either when training the model or executing the trained model, the vehicle velocity value can be converted into a one-hot label by discretizing the velocity value into the bin corresponding to the velocity range encompassing the value. In some examples, the discretized data may be stored as a binary vector including a one (1) (or other designated value) at the vector location of the bin containing the one-hot label, and a zero (0) (or other designated value) at all other locations in the vector. For instance, a simplified example of a discretized vehicle velocity using one-hot encoding may be stored as the binary vector [0, 0, 0, 1, 0, 0], in which six separate bins are defined for continuous velocity ranges and the observed velocity falls within the fourth bin. Although this example includes six labeled bins, any number of bins (e.g., 128, 256, etc.) may be used in other examples.

One-hot encoding and other encoding schemes may be valuable as data preparation tools for converting continuous data variables, such as velocity and steering angle, into discretized data (e.g., binary or integer data) that can be provided as input to ML models and algorithms such as CNNs and RNNs. These encoding schemes also provide advantages for training models, including more easily providing probabilistic predictions rather than single label predictions, as well as easy rescaling of the training data.

Generally, when training an object movement ML model the training component may provide input data to the model, receive corresponding output data from the model, and compare the model output data to ground truth data to evaluate the performance of the model. For instance, the model output data may include one or more probability distributions representing a predicted vehicle velocity, acceleration, steering angle, etc., at a next time step following the time step associated with the input data. In some examples, the training component may use a cross-entropy loss function (or other loss function) to compare the model output data with the ground truth data. Cross-entropy loss functions can be used as loss functions when optimizing logistic regression models and various types of artificial network networks. Cross-entropy loss function may calculate the difference (e.g., in total entropy) between two probability distributions. In some examples, the model output data may include a vector of logits representing prediction probabilities corresponding to the ground truth data provided to the model as input. In some examples, the cross-entropy loss may be determined by calculating $-\Sigma_i \text{label}_i * \log(\text{pred}_i)$ across the vector, where label_i represents the numeric value at the i position of the vector generated using one-hot encoding based on the ground truth data, and pred_i represents the numeric value at the i position of the vector output by the model. Although a cross-entropy loss function may provide technical advantages in some implementations, such as when the continuous movement values includes multimodal data, in other examples the training component may use additional and/or alternative types of loss functions (e.g., KL divergence).

However, although using encoding schemes for discretizing continuous data, and using cross-entropy loss (or similar distribution comparison techniques) provide advantages in training ML models, these techniques may present technical challenges when used together and/or may be suboptimal for training object movement models and other similar models (e.g., where small divergences in a continuous value are penalized based on discretization choices, such as ranges of velocities, distances, etc.). For example, although calculating cross-entropy loss may be appropriate for evaluating predictive models with completely independent labeled bins, when the labeled bins are related in proximity to one another, cross-entropy loss may be unable to distinguish between near misses and far misses. For example, object movement data (e.g., velocity data or steering data) encoded and discretized into a one-hot label represented by vector [0, 0, 0, 0, 1, 0] may indicate a relatively high vehicle velocity or steering angle. In a real-world or simulated driving environment, that vector may be closer in terms of real-world object movement data to the one-hot label vector [0, 0, 0, 1, 0, 0] (e.g., indicating a mid-range velocity or steering angle) than to the one-hot label vector [1, 0, 0, 0, 0, 0] (e.g., indicating a relatively low velocity or steering angle). However, a cross-entropy loss function may compute similar or identical losses for predictions near and farther away from the ground truth data. For instance, if a first vector [0, 0, 0, 0, 1, 0] represents a ground truth object movement value, a first model output prediction of [0.4, 0, 0, 0, 0.6, 0] and a second model output prediction of [0, 0, 0, 0.4, 0.6, 0] would be evaluated as having the same cross-entropy loss penalty. Although the same cross-entropy loss would be calculated for the first and second model output in this example, in a real-world driving scenario with the data representing predicted object movement, the second model output is significantly closer to the ground truth data and thus would be preferred over the first model output prediction.

To address the problems associated with training ML models, and in particular training ML models using encoded data in labeled bins that are related by proximity, the techniques described herein include smoothing the ground truth data used by the loss function to reduce the loss penalties for incorrect predictions that are near the ground truth relative to incorrect predictions that are farther from the ground truth. In some examples, the training component may perform smoothing of the ground truth data using a set of values determined from a Gaussian quadrature function (or other weight sum function), that may be centered on the label bin corresponding to the ground truth data. As described below in more detail, by smoothing the ground truth data and using the smoothed data to calculate the cross-entropy loss, the loss may be reduced for incorrect probability mass that is closer to the ground truth data. As a result, model outputs having a probability mass that is closer to the ground truth data may be favored during the training process, and the relatively small penalties for near-miss predictions may result in improved model performance for object movement predictions such as velocity and steering angle.

The techniques discussed herein may be implemented in a number of ways to improve the operation of autonomous vehicles and/or the functioning of computing systems. In some examples, object movement ML models trained using the techniques described herein may be used by object controllers to control smart agents during driving simulations. In these examples, the model training improvements may result in improved object movement models that cause the smart agents to navigate and maneuver in a more realistic manner within the simulated environments. By improving the realistic driving behavior of simulated smart agents, these techniques also improve the efficacy of the simulations themselves, thereby enabling an increased breadth and quality of evaluation of the features and functionality of autonomous vehicles. Thus, these techniques may improve the functioning, safety, and efficiency of autonomous and semi-autonomous vehicles operating in real-world driving environments, by generating and executing simulations that can more effectively test and validate the features and components of the autonomous vehicle.

Additionally, although certain examples described herein include using the trained object movement models to control smart agents within simulations, in other examples object movement models trained using these techniques may be deployed and used on vehicles traversing non-simulated, real-world environments. In such examples, the improved ML models may be used for vehicle navigation, route planning, incident avoidance, and the like, thus improving the overall vehicle safety and efficiency when operating in various driving environments.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 depicts an example process 100 of training an ML model (e.g., a vehicle motion and/or navigation model) configured to control the movement of an autonomous vehicle. In various implementations, some or all of the operations in process 100 may be performed by machine learning systems configured to train and execute ML models, such as a training component 102 described in more detail below.

At operation 104, an ML model training component, such as training component 102 may receive object movement ground truth data associated with one or more objects (e.g., vehicles) operating in real-world physical environments. The ground truth data received in operation 104 may be based on log data captured by the sensors of the vehicles, and the data may include any movement or operational data associated with the vehicles themselves and/or other objects in the environment. As shown in this example, the log data may correspond to a driving scene 106, during which a vehicle 108 captures and/or determines the log data using sensor systems while operating in a physical environment. The ground truth data may include data representing the driving scene 106 over a period of time (e.g., 20 seconds, 30 seconds, 45 seconds, etc.), including the positions, movements, and/or other states for the various objects in the driving scene at a sequence of time steps. In this example, the ground truth data received in operation 104 may include, for each time step, the complete state of the vehicle 108 (e.g., including observable attributes and/or internal state data), the perceived states of the other vehicles 110 in the driving scene (and/or other pedestrians, bicycles, animals, etc.), and various attribute of the driving scene 106 itself (e.g., maps and road network data, weather conditions, lighting conditions, road conditions, etc.).

In some examples, the ground truth data received in operation 104 may include data observed and/or perceived by the vehicle 108, such as data identifying characteristics of the environment and/or other objects (e.g., vehicles 110) detected in proximity to the vehicle 108. For instance, for each vehicle 110 detected in the environment, the vehicle may detect and/or determine the agent's classification, size, shape, position, location, trajectory, velocity, acceleration, jerk, and the like, at periodic time intervals (e.g., every 0.1 seconds, every 0.05 seconds, every second, etc.) during the driving scenario. In some examples, the ground truth data may include object types of the vehicles 110 and/or other perceived objects in the driving scene 106. An object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.). The ground truth data also may include object trajectories associated with the vehicles 110 and/or any other objects. An object trajectory may include a direction of travel, a speed, an acceleration, a jerk, or the like of an object at a particular time step during the driving scene 106. In some examples, the data may include a number of object trajectories associated with a number of times of the ground truth data. In at least one example, the number of times may include times at a periodic interval. The ground truth data also may include locations, positions, and/or orientations of the vehicles 110 at each period interval time step. In some examples, the ground truth data may include data identifying events observed by the vehicle 108, such as collisions or near-miss collisions, traffic violations, crossing or jaywalking pedestrians, cyclists, or animals, weather anomalies, construction zones, detours, school zones, and the like. Such events may be associated with one or more of the vehicles 110, and the events and/or behaviors may be designated from a list of events and/or agent behaviors.

At operation 112, the training component 102 may discretize and/or normalize the ground truth object movement data received in operation 104. As described above, certain types of object movement data (e.g., velocity, steering angle, acceleration, etc.) may include an indefinite set of continuous values over a range. For instance, a velocity range may include the minimum and maximum observed velocities for the vehicle 108, a steering angle range may include the minimum and maximum observed steering angles for the vehicle 108, etc. In operation 112, the training component 102 may discretize the object movement data using a predetermined set of labeled bins. For instance, the training component 102 may clip the observed data for one type of movement data (e.g., velocity, steering angle) between minimum and maximum values, normalize the overall range (e.g., to [0, 1]), and determine a set of labeled bins into which movement values can be stored or assigned. Each bin in a set of labeled bins may correspond to a continuous sub-range of movement values, and the bins may be ordered (e.g., decreasing or increasing sub-range values) to cover the overall range of movement values.

For an individual object movement value received in the ground truth data in operation 104, the training component 102 may discretize the individual value by determining which of the labeled bins corresponds to the individual value. In some examples, the training component 102 may use a one-hot encoding scheme in which the individual movement value is stored as a vector storing a one (1) at the vector location of the labeled bin corresponding to the value, and storing zeros in the other vector locations. One-hot labels may be stored and represented as binary vectors, bit maps, and/or histograms as shown in box 114. In this example, a velocity histogram 116 represents a ground truth velocity value that has been discretized using one-hot encoding. The non-zero labeled bin is the bin corresponding to the velocity range that includes the ground truth velocity value. Similarly, the steering angle histogram 118 represents a ground truth steering angle value that has been discretized using one-hot encoding.

At operation 120, the training component 102 may smooth the discretized object movement data, resulting in smoothed data. As discussed above, when one-hot labeling or similar encoding schemes are used for ML model training and execution, the training component 102 may discretize the ground truth data by maximizing the single value stored in the labeled bin that corresponds to the ground truth data, and minimizing or zeroing-out the values stored in the other labeled bins. In operation 120, the training component 102 may perform a smoothing function to modify one-hot labeling of the ground truth data performed in operation 112. In some cases, the smoothing function may transform the binary vector into a non-binary vector of the same size, in which the value stored in the labeled bin corresponding to the ground truth data is decreased, and/or the values stored in the adjacent and other nearby labeled bins are increased.

In some examples, the training component 102 may use a set of values determined based on the weight values of a Gaussian quadrature function (or other weight sum function), in which the set of has a maximum value at a center location and decreasing values in each direction from the center location. For example, when using a Gaussian quadrature function, the training component 102 may generate a set of values based on the weights of the Gaussian quadrature, for any order (or seed) of Gaussian quadrature. The order or seed of the Gaussian quadrature may determine the total number of values in the smoothed data, which may correspond to the width of the smoothed histogram and/or distribution represented by the smoothed vector. In some examples, the training component 102 may determine the weight values for the Gaussian quadrature based on the roots of the associated Legendre polynomials, and may divide the weight values by 2 to assure that the numeric sum of the set of smoothed values is equal to 1. For example, using the roots of the Legendre polynomials for a seed 3 Gaussian quadrature, the determined set of values for the smoothed vector may be [0.276, 0.444, 0.276], using the roots of the Legendre polynomials for a seed 5 Gaussian quadrature, the determined set of values may be [0.118, 0.240, 0.284, 0.240, 0.118], and so on. The values determined by the Gaussian quadrature function (or other smoothing function) may be centered on the labeled bin of the ground truth data, thereby producing a vector (or distribution) of values having a maximum value at the bin corresponding to the ground truth and decreasing values moving out in each direction from the ground truth one-hot labeled bin. Although various different functions may be used to determine the values for the smoothed vector, the Gaussian quadrature function may provide computational efficiencies in some cases, in that the Gaussian quadrature is already discretized and easily sums to 1. Further, when an odd order or seed is used for the Gaussian quadrature (e.g., 3, 5, 7, etc.), the resulting set of smoothed values will have a maximum value at the center location (or center vector component) with decreasing values out from the center. Additionally, the decreasing values determined by the Gaussian quadrature may decrease less quickly as compared to normal Gaussian distributions, thus allowing the values determined from a Gaussian quadrature to provide additional relevance/weight to the near-miss probability mass output from the ML model.

Although using a Gaussian quadrature to determine the values for the smoothed vector is described in certain examples herein, other functions may be used in other examples to determine the set of smoothed values in operation 120. For instance, any function that can discretized and can be adjusted to sum to 1 may be used as a smoothing function in various examples. As noted above, it may be advantageous in some cases to use functions that have a single maximum value at a center vector component/location, so that the maximum value can be aligned with the vector component of the one-hot bin representing the ground truth data. Additionally, it may be advantageous to use functions with various decreasing patterns from the maximum center value, to provide the smoothing effect and to apply decreasing relevance/weight to the probability mass output of the ML model as that probability mass moves further from the ground truth data. Functions that may be used to determine the values for the smoothed vector in operation 120 may include, for example, a normal Gaussian or a negative quadratic (with roots determined based on the desired width of the histogram/smoothed vector). Additionally, although symmetrical functions are described in some examples, resulting in symmetrical sets of values for the smoothed vector in operation 120, in other examples the training component 102 may use asymmetrical functions and/or asymmetrical sets of values for the smoothed vector. For example, an asymmetrical function may be used to determine a set of larger values on one side of the maximum center value and smaller values on the other side, in order to purposefully bias the movement of the vehicle (or other object) in a particular direction based on the current environment, the road/lane position of the vehicle, the presence of object objects in the environment, etc.

Like the unsmoothed discretized data generated in operation 112, the smoothed data generated in operation 120 also be stored in various different forms and/or data structures. For instance, the smoothed data generated in operation 120 may be stored as a non-binary (e.g., continuous) vector of the same size as the binary vector generated in operation 112. Additionally or alternatively, the unsmoothed and smoothed ground truth data generated respectively in operation 112 and in operation 120 may be stored and represented as bit map data, histograms, and/or any other representation of a numerical distribution. As shown in box 122, a modified velocity histogram 124 (or modified velocity vector) is shown representing the output of a Gaussian quadrature function performed based on the velocity ground truth data shown in the velocity histogram 116. Similarly, a modified steering angle histogram 126 (or modified steering angle vector) is shown representing the output of a Gaussian quadrature function (or other smoothing function) performed based on the steering angle ground truth data shown in the steering angle histogram 118.

At operation 128, the training component 102 may perform a training operation on a machine learning (ML) object movement model, corresponding to the ground truth object movement data received in operation 104. Operation 128 may represent multiple separate processes that can be performed independently by the training component 102, using the discretized ground truth data generated in operation 112 and/or the smoothed ground truth data generated in operation 120. For example, as shown in box 130, operation 128 may include executing an ML model 132 based on the ground truth object movement data received in operation 104. The output of the ML model 132 may be compared to a set of smoothed ground truth data 134 generated in operation 120. In this example, the training component 102 may use a cross-entropy loss function 136 to compare the output of the ML model 132 to the smoothed ground truth data 134 (e.g., corresponding to the next or future time step of the model output). The loss determined by the cross-entropy loss function 136 may indicate the performance of the ML model 132 in predicting object movement based on the ground truth data received in operation 104. In various examples, various aspects may be trained independently (e.g., learning a velocity in one or more dimensions) or simultaneously. In such examples which output data simultaneously (e.g., velocity in a first dimension, position, etc.), a one-hot tensor may be used as ground truth and smoothed over multiple dimensions using similar techniques as set forth herein.

The ML model 132 may be implemented as a deep learning model (e.g., CNN or RNN) configured to receive input data representing a current vehicle state and/or driving environment, and to output a predicted object movement data. In some examples, the predicted object movement data may include a predicted vehicle velocity and/or a predicted vehicle steering angle for a time step after the time step associated with the input data. In some examples, the output of the ML model 132 may include binary vectors and/or matrices having a similar or identical structure to at least some of the model input data. For instance, the model outputs may include a velocity vector and/or steering angle vector having the same size and/or structure as the input velocity vector and input steering angle vector. In various examples, the ML model 132 may output individual predicted movement values (e.g., a single predicted velocity, a single predicted steering angle, etc.) or may output a probability distribution of predicted movement data (e.g., vectors storing probability distributions for predicted velocity, predicted steering angle, etc.).

For simplicity, some examples describe the ML model 132 as receiving two inputs representing an input velocity and an input steering angle, and providing two corresponding outputs representing a predicted future velocity and predicted future steering angle. Although certain simple examples of object movement models may be trained to predict an updated object state and/or movement data based on a limited number of one or more input parameters (e.g., velocity and/or steering angle), it can be understood from the context of this disclosure that the ML model 132 may have any number of inputs and outputs, and any amount of network layers and/or computational complexity. For instance, the ML model 132 may be configured to receive any number of additional input data (e.g., vehicle state data, intended route data, other static and dynamic object data, maps/road data, environment state data, driving conditions data, etc.), any of which may or may not be discretized as described above. Additionally, the ML model 132 may be configured to output any number of additional output corresponding to predicted vehicle states, predicted states of other vehicles and objects in the environment, etc.

In some examples, the output of the ML model 132 may include a probability distribution of predictions of object movements and/or positions. For instance, the ML model 132 may output a predicted velocity vector and/or a predicted steering angle vector, in which each output vector includes multiple values representing a velocity probability or steering angle probability within the range values of the corresponding labeled bin. If the ML model 132 outputs a predicted velocity vector of [0, 0, 0, 0, 0.6, 0.4], then in this example the model has predicted that the velocity of the vehicle at the next time step has a 60% probability of falling within the velocity range of the fifth labeled bin and a 40% probability of falling within the velocity range of the sixth labeled bin. As another example, if the ML model 132 outputs a predicted steering angle vector of [0, 0.15, 0.4, 0, 0.45, 0], then in this example the model has predicted that the steering angle of the vehicle at the next time step has a 15% probability of falling within the steering angle range of the second labeled bin, a 40% probability of falling within the steering angle range of the third labeled bin, and a 45% probability of falling within the steering angle range of the fifth labeled bin.

The cross-entropy loss function 136 may compare the prediction output by the ML model 132 to the corresponding smoothed ground truth data 134. As discussed above, a prediction output by the ML model 132 may be a probability distribution including different probability values associated with different labeled bins. The smoothed ground truth data 134 also may be a distribution of a similar or identical size, that is centered around the ground truth labeled bin and decreasing out based on the Gaussian quadrature function (and the degree) or other smoothing function used to generate the smoothed ground truth data 134. By using the smoothed ground truth data 134 (e.g., rather than the unsmoothed discretized ground truth data generated in operation 112), the cross-entropy loss function 136 may calculate smaller loss penalties for model outputs that have a probability mass closer to the ground truth labeled bin. In contrast, for model outputs that have a probability mass that is spread out and/or farther from the ground truth labeled bin, the cross-entropy loss function 136 may calculate larger loss penalties. As a result, the loss calculations of the cross-entropy loss function 136 may affect the ML model training process to favor model outputs having probability masses that are closer to the ground truth data, representing near-miss object movement predictions. As described above, such near-miss object movement predictions may be preferred in real-world driving scenarios when the data represents predicted object movements such as velocities and/or steering angles. Thus, the use of the smoothed ground truth data 134 improves the evaluations of the cross-entropy loss function 136 and the overall model training process, resulting in improved performance of the trained ML object movement models.

Figure 2:
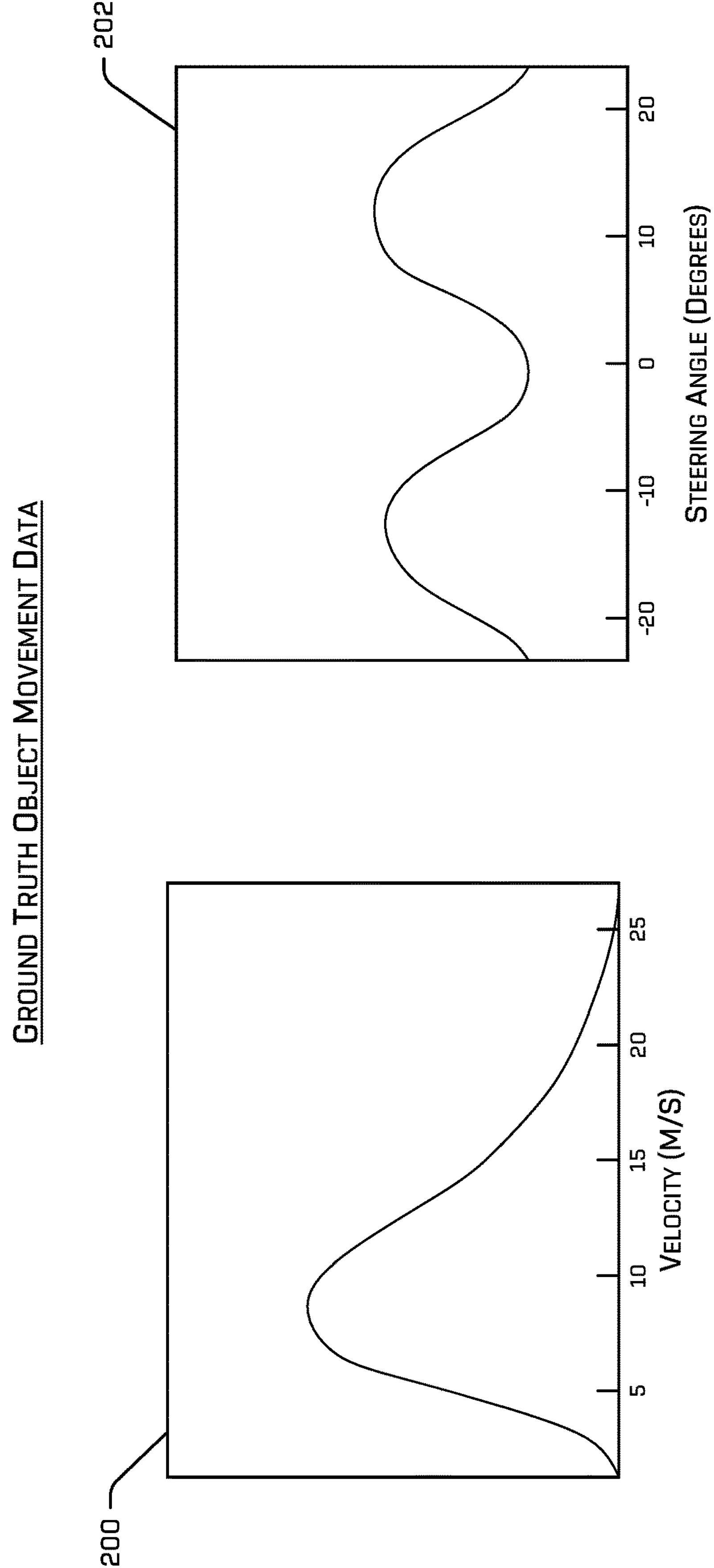
FIG. 2 illustrates an example object movement velocity and steering angle ground truth data, in accordance with one or more implementations of the disclosure.

FIG. 2 depicts two graphs showing example distributions of object movement ground truth data. In this example, graph 200 depicts a velocity distribution for a vehicle, ranging from 0 to approximately 25 meters per second (m/s). Graph 202 depicts a steering angle for the vehicle, ranging from approximately −25 degrees to approximately +25 degrees. The distributions shown in FIG. 2 may be based on ground truth velocity and steering angle data received from a vehicle or multiple associated vehicles (e.g., vehicles of the same type, driving on the same road and/or in the same region, etc.) over a period of time. In various examples, the velocity distribution shown in graph 200 (which also may be referred to as speed) may represent velocity in the x-direction, velocity in the y-direction, and/or a normalized velocity vector based on post-processing of the combined x-direction and y-direction velocity.

As shown in this example, different types of object movement data may have different data shapes or characteristics of distributions. For instance, graph 200 depicts a generally non-normal for vehicle velocity, and graph 202 depicts a bi-modal distribution for steering angle. The ground truth object movement data may include joint probability distributions in some examples between two or more aspects or dimensions of object movement data. Additionally, in some examples, the training component 102 may select a loss function based on the characteristics of the object movement ground truth distributions. For instance, a cross-entropy loss function may provide technical advantages when training models with multi-model data distributions.

Figure 3:
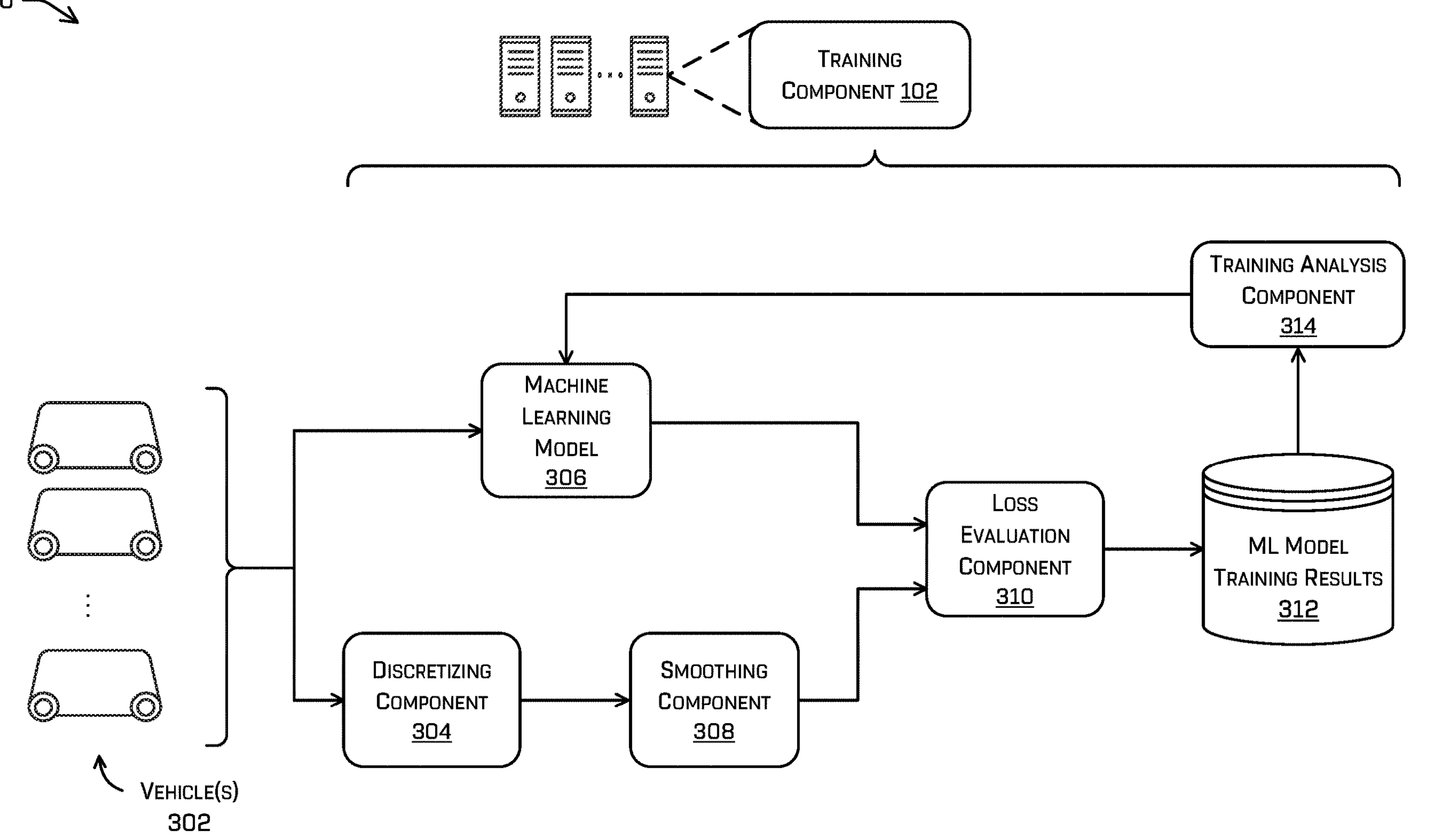
FIG. 3 is a block diagram illustrating an example training component for training machine learning models for object movement and/or navigation, in accordance with implementations of the disclosure.

FIG. 3 is a block diagram illustrating components of an example training component 102. As described above in reference to FIG. 1, the training component 102 may be configured to train object movement ML models based on ground truth data received from vehicles operating in real-world driving environments. ML models trained using the training component 102 may be used by a simulation system to control one or more smart agents in driving simulations, or may be deployed within an autonomous vehicle operating in a real-world physical environment.

In this example, one or more vehicles 302 operating on various roadways in real-world conditions and environments may be in communication with the training component 102 operating separately from the vehicles 302. The vehicles 302 may capture and provide log data to the training component 102. The training component 102 may parse and analyze the log data received from the vehicles 302 to derive ground truth object movement data to be used for training ML models. Although object movement data may include velocity data, steering angle data, and the like, the ground truth data received from the vehicles 302 can include any combination of vehicle state data, the intended destination or route of the vehicle, object data and attributes for other object perceived by the vehicles 302 in the environment, and/or attributes of the driving environment (e.g., map data, road network data, weather and driving conditions, etc.).

After receiving ground truth object movement data, the ground truth object movement data may be provided as input to the ML model 306. Object movement data may include, for example, velocity and steering angle values within a continuous range of values. Additionally, the discretizing component 304 may discretize the ground truth data into a structure and/or format for providing the data as input to the smoothing component 308. In such examples, the discretizing component 304 may discretize the object movement data using one-hot encoding or a similar encoding scheme. The one-hot encoding scheme may determine a set of labeled bins corresponding to contiguous velocity ranges, contiguous steering angle ranges, etc., and the discretizing component 304 may determine the particular bin associated with a ground truth object movement value. In some examples, the discretizing component 304 may use one-hot labeling to generate a binary vector representing an object movement value (e.g., a velocity or a steering angle), in which a single labeled bin corresponding to the movement value is assigned to one and the other bins in the vector are assigned to zero.

During a training process for an ML model 306, the model may be provided with various training data from a model training data set. Each training data in the training data set, which may correspond to one set of model input data, is provided as input to the ML model 306, after which the output of the ML model 306 is evaluated to determine the predictive performance of the model for the training data. In some examples, the performance of the ML model 306 for each training data in the training data set may be quantified and/or aggregated to determine an overall performance level for the ML model 306 with respect to the training data. The training component 102 may execute the ML model 306 using the ground truth data as input data, and may provide the model output to the loss evaluation component 310. As discussed above, the output of the ML model 306 may be a probability distribution including different probability values associated with different labeled bins in the one-hot encoding scheme.

The discretized vector data (e.g., one-hot labels) from the discretizing component 304 also may be provided to the smoothing component 308. The smoothing component 308 may use a smoothing function, such as a Gaussian quadrature function or other weight sum function, to determine smoothed vector data based on the discretized vector data. In this example, the discretized vector data may represent one-hot encoded ground truth object movement data (e.g., velocity or steering angle for a vehicle or other object(s)), and smoothing component 308 may convert the discretized vector data into a smoothed vector by decreasing the bin label of the ground truth data while increasing other nearby bin labels. The effect of using values from the smoothing function may be to broaden and/or smooth the representation of the ground truth data. The smoothing component 308 may be configured to determine the bin label of the ground truth data as a central location for the smoothing function, and then to determine a set of values from a smoothing function (e.g., the weights from a Gaussian quadrature with an odd degree) for the smoothed vector, in which the set of values are centered on the same central location of the one-hot bin label. The set of values may be determined so that the bin label of the ground truth data maintains a maximum value in the smoothed vector, and the other values in the smoothed vector decrease in magnitude in both directions as the distance from the bin label of the ground truth data increases.

In some examples, the values determined from the Gaussian quadrature or other smoothing function may transform (and/or replace) the one-hot labeled discretized vector data into smoothed vector data while maintaining the same numeric sum for the vector. For instance, in a one-hot labeling scheme in which the bin label of the ground truth data is assigned the one and the other bin labels are zeroed out, the numeric sum of the one-hot (unsmoothed) vector is equal to one (1). In this example, the smoothing component 308 may determine a distribution of values from the smoothing function such that the distribution of values also sums to one (1).

The loss evaluation component 310 may receive and compare the output predictions from the ML model 306 and the modified/smoothed ground truth data from the smoothing component 308. In some examples, both the model output and the smoothed ground truth data may be represented as distributions (e.g., stored as vectors, histograms, etc.). For each training data, the loss evaluation component 310 may use a loss function (e.g., cross-entropy loss) to calculate a difference between the prediction output of the ML model 306 and the smoothed ground truth data. The difference may represent the performance of the ML model 306 with respect to outputting an accurate prediction based on the training data. In some examples, the loss evaluation component 310 may calculate cross-entropy loss as −sum_i (label_i*log (pred_i)) across the distribution (or vector), where label_i represents the numeric value at the i position of the vector generated using one-hot encoding based on the ground truth data, and pred_i represents the numeric value at the i position of the vector output by the model.

The training component 102 may store the training data and corresponding loss data in the ML model training results data store 312. In some examples, the training analysis component 314 may analyze the loss data for a training data set, and may execute an algorithm to minimize the training loss. In some examples, the training analysis component 314 may aggregate the losses over each training data in a training data set, and may adjust the parameters (e.g., weights and biases) of the ML model 306 between training iterations to attempt to reduce and/or minimize the aggregated loss. The training analysis component 314 may use any number of loss functions, including but not limited to a squared loss function and/or mean square error to determine an average and/or aggregate loss over the training dataset. When the loss generated by the ML model 306 when using a particular set of weights and biases is reduced to a minimum value and/or is below a loss threshold, the training analysis component 314 may terminate the training process and use the particular weights and biases for the trained ML model.

Figure 4:
FIG. 4 illustrates an example technique of smoothing ground truth object movement data, in accordance with one or more implementations of the disclosure.
Figure 4:
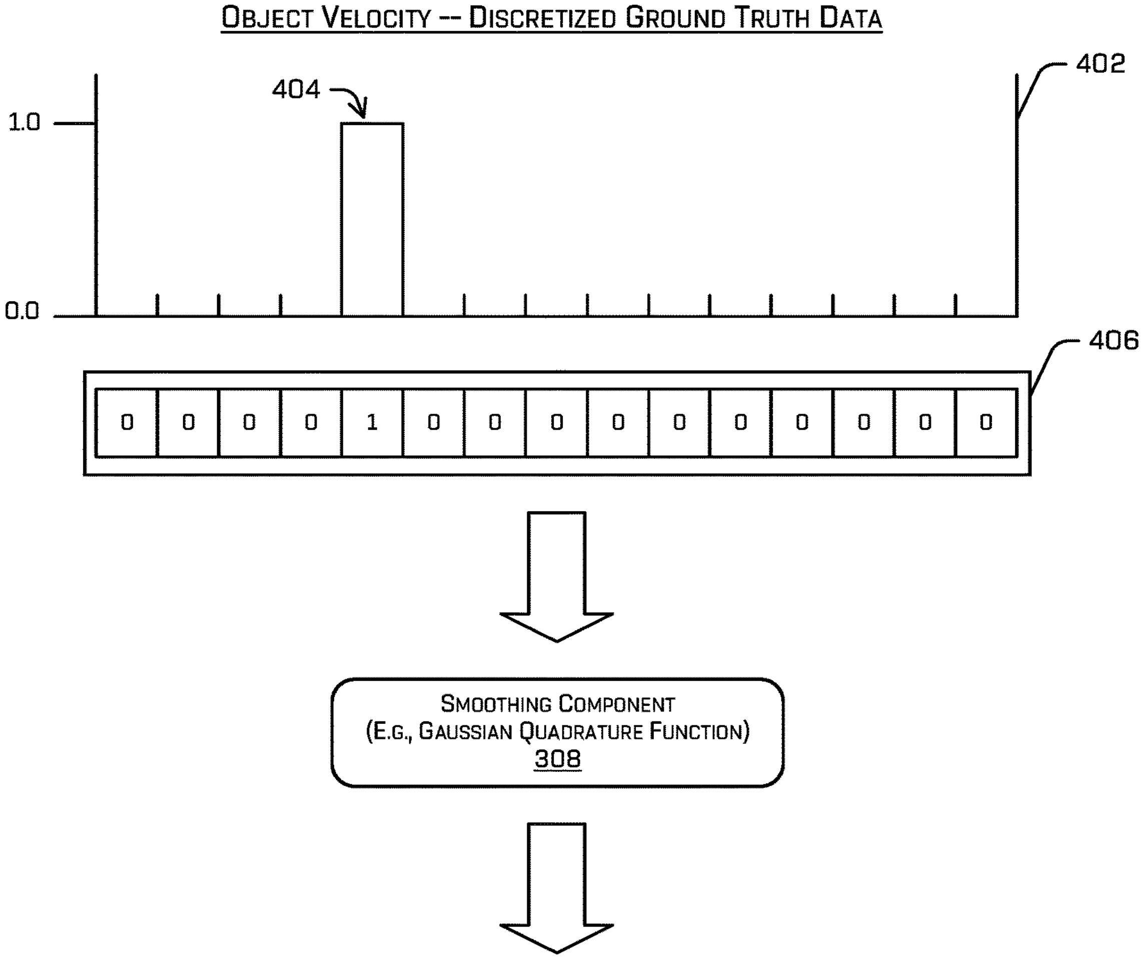
Figure 4:
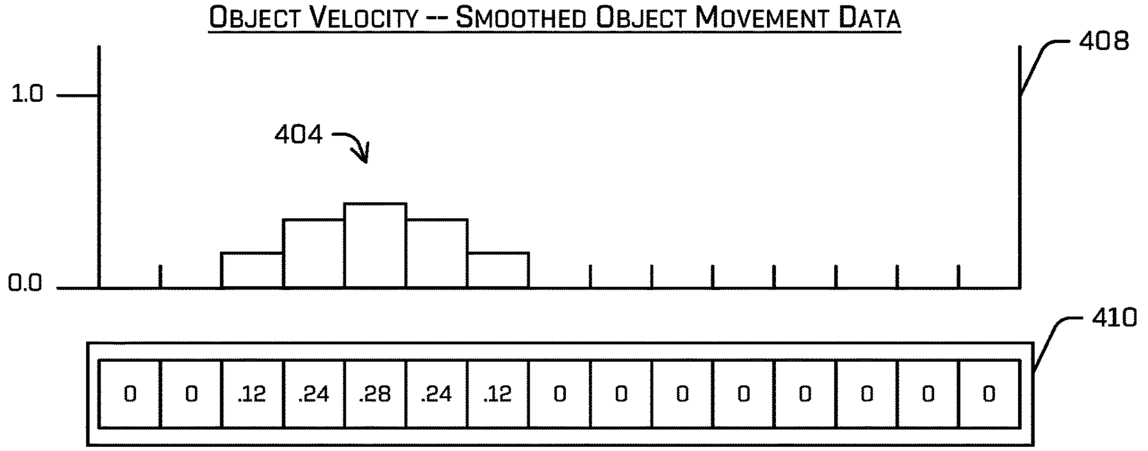

FIG. 4 is a diagram 400 depicting an example technique of using a smoothing component 308 to transform discretized ground truth object movement data. As shown in this example, the smoothing component 308 may use a Gaussian quadrature function to determine a values for a smoothed vector based on one-hot labeled ground truth data, and may center the smoothed distribution on the labeled bin corresponding to the ground truth data. As shown in this example, the ground truth data may correspond to vehicle velocity data. However, in other examples, similar or identical techniques may be used to transform and smooth other types of object movement data (e.g., steering angle data) and/or input data for various other ML models.

Histogram 402 depicts vehicle velocity data that has been discretized using one-hot encoding or a similar encoding scheme. Based on the value of ground truth vehicle velocity, the velocity value in this example has been assigned to a labeled bin 404. The training component 102 may determine the labeled bin 404 as the bin with the velocity range encompassing the ground truth velocity value, and may generate the histogram 402 by assigning the labeled bin 404 to one (1) and zeroing-out the other bins in the histogram. Thus, the histogram 402 depicts an entirely narrow (and unsmoothed) distribution within the labeled bin 404. The binary vector 406 is a numeric representation of the histogram 402.

In this example, the smoothing component 308 may use a Gaussian quadrature function (or other weight sum smoothing function) to determine the values to convert the discretized velocity value in histogram 402 and vector 406, into a corresponding smoothed representation of the same discretized velocity value. The smoothing component 308 in this example may determine the degree (e.g., 5) for the Gaussian quadrature function, based on the size of the vector 406 (e.g., the number of labeled bins) and/or the location of the labeled bin 404 containing to the ground truth data. In some examples, odd degree may be selected to assure that the smoothed data is symmetrical and has a single maximum value corresponding to the location of the labeled bin 404 (and to assure that the initial binary vector with the one-hot label can be derived from the smoothed vector). To transform/smooth the one-hot labeled data, the smoothing component 308 may determine a set of values from a smoothing function and center the values on the location of labeled bin 404, so that the resulting smoothed data has a maximum weight at the vector component corresponding to the center location and decreasing values for the labeled bins on either side. Additionally, in some cases, the smoothing function may be configured to output smoothed data having the same numeric sum (e.g., 1) as the histogram 402 and the binary vector 406.

The histogram 408 depicts a representation of the same vehicle velocity data that has been smoothed by the smoothing component 308. As shown in this example, the smoothed data depicted in histogram 408 shows a wider distribution, but is centered on the same labeled bin 404 and has the same numeric sum (e.g., 1) as the unsmoothed distribution shown in histogram 402. Vector 410 in this example (e.g., a non-binary vector) numerically represents the smoothed histogram 408.

In this example, due to the location of the one-hot vector component (e.g., labeled bin 404) within the binary vector 406, and the number/width of values determined by the smoothing function (e.g., 5 values), it is possible to generate the smoothed vector 410 so that it contains the entire set of 5 smoothed values determined based on the fifth-order Gaussian quadrature. However, in some cases the configuration of smoothed values determined by the smoothing component 308 may be truncated, for example, if the one-hot vector component is too close either end of the binary vector 406 and/or if the smoothing component 308 determines a large number of smoothed values for widely smoothing the ground truth data. In such examples, if the one-hot vector component (e.g., labeled bin 404) is too close to the end of the binary 406 so that a portion of the distribution will be truncated in the smoothed vector 410, the smoothing component 308 may redistribute the truncated portion using a number of techniques. For instance, the smoothing component 308 may use a lower order Gaussian quadrature (or smaller root values in other smoothing functions) in response to determining a truncation portion of the smoothed distribution, so that a narrower smoothing pattern is determined. In other instances, the smoothing component 308 can redistribute any truncated portion of the smoothed distribution to the other portions of the distribution (e.g., equally and/or normalized so that the relative proportions of the distribution remain the same), or may redistribute the entire truncated portion into the center bin (e.g., labeled bin 404) to assure that the center bin remains a single maximum value in the smoothed distribution.

Figure 5:
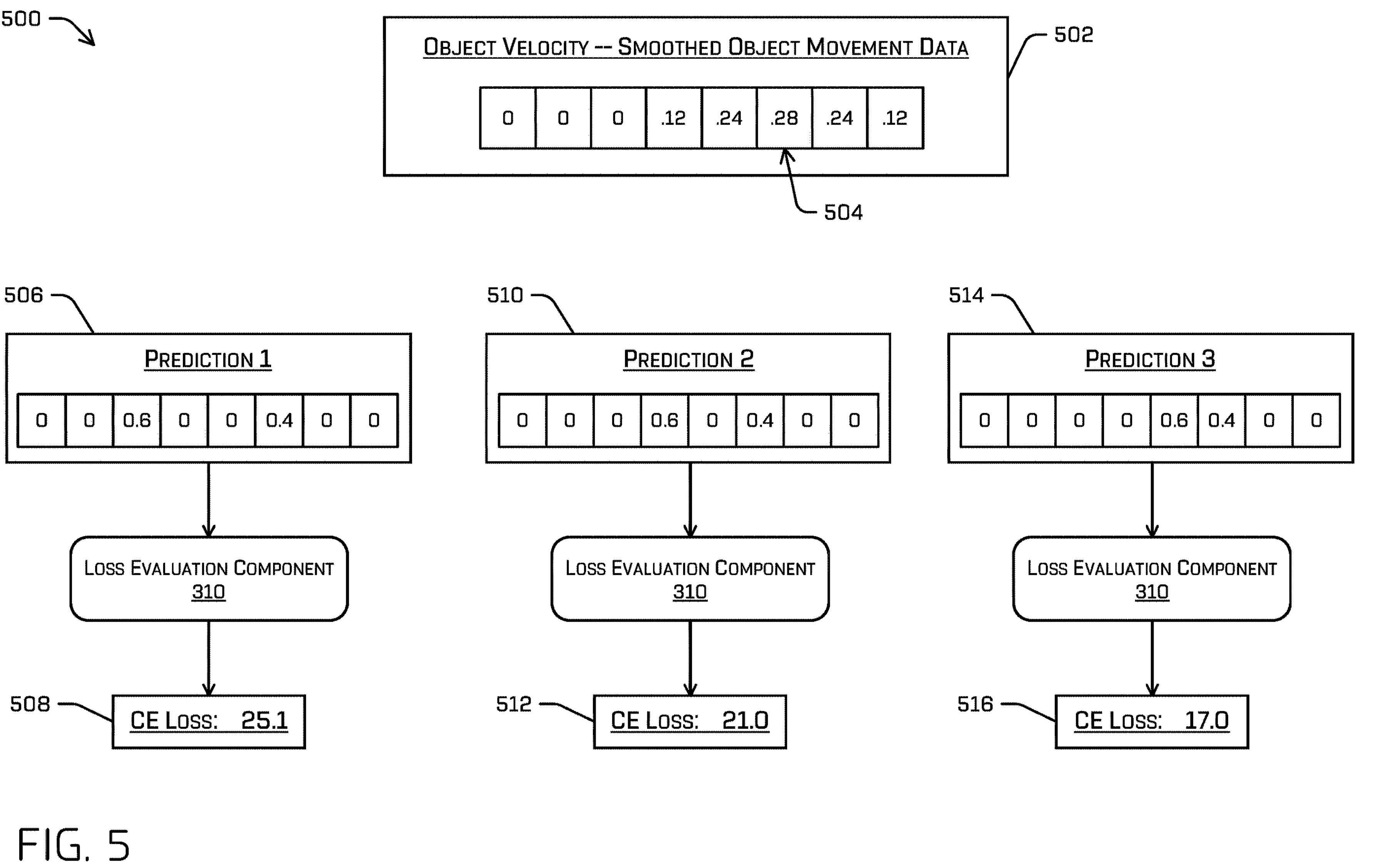
FIG. 5 depicts examples of a technique for determining a cross-entropy loss associated with a model output using smoothed data, in accordance with one or more implementations of the disclosure.

FIG. 5 is a diagram 500 depicting examples of a technique for determining cross-entropy loss for ML model outputs, by comparing the model outputs to smoothed ground truth data. As described above, the loss evaluation component 310 may perform cross-entropy loss function to calculate a loss value associated with an output predicted by an ML model 306. For instance, the loss evaluation component 310 may apply cross-entropy loss techniques to compare and quantify the difference between the probability distribution of the predicted output and the distribution of the smoothed ground truth data.

In this example, vector 502 represents a discretized ground truth vehicle velocity that has been converted into smoothed data using a Gaussian quadrature or other weight sum smoothing function. Location 504 within vector 502 represents the labeled bin of the velocity ground truth data, as it is the maximum and the center of the distribution of the smoothed data.

Three examples of loss calculations are also shown in this example, in which the loss evaluation component 310 calculates loss by comparing the smoothed ground truth data in vector 502 to the output prediction of the ML model 306. In the first example, the loss evaluation component 310 compares the first model prediction 506 to the vector 502 to determine a first cross-entropy loss value of 25.1 (in box 508). In the second example, the loss evaluation component 310 compares the second model prediction 510 to the vector 502 to determine a second cross-entropy loss value of 21.0 (in box 512). In the third example, the loss evaluation component 310 compares the third model prediction 514 to the vector 502 to determine a third cross-entropy loss value of 17.0 (in box 516).

Initially, it can be understood from these examples that if the loss evaluation component 310 used unsmoothed ground truth data (e.g., a binary vector with a one-hot label at location 504) to evaluate the model predictions, then the cross-entropy loss would be the same for all three examples. Instead, by using the smoothed ground truth data depicted in vector 502, the cross-entropy loss function is able to distinguish between the different predictions. Specifically, by using the smoothed ground truth data, which is centered at the location 504 of the ground truth labeled bin and includes a pattern of decreasing values around location 504, loss evaluation component 310 may calculate smaller loss penalties for model predictions that have a probability mass closer to the labeled bin containing the ground truth data. As described above, these near-miss predictions for object movements such as velocity and steering angle may be preferred in real-world driving scenarios when the data represents predicted object movements such as velocities and/or steering angle. Thus, the use of the smoothed ground truth data improves the loss data calculated by the loss evaluation component 310 and the overall model training process, resulting in improved performance of the trained ML object movement models.

Figure 6:
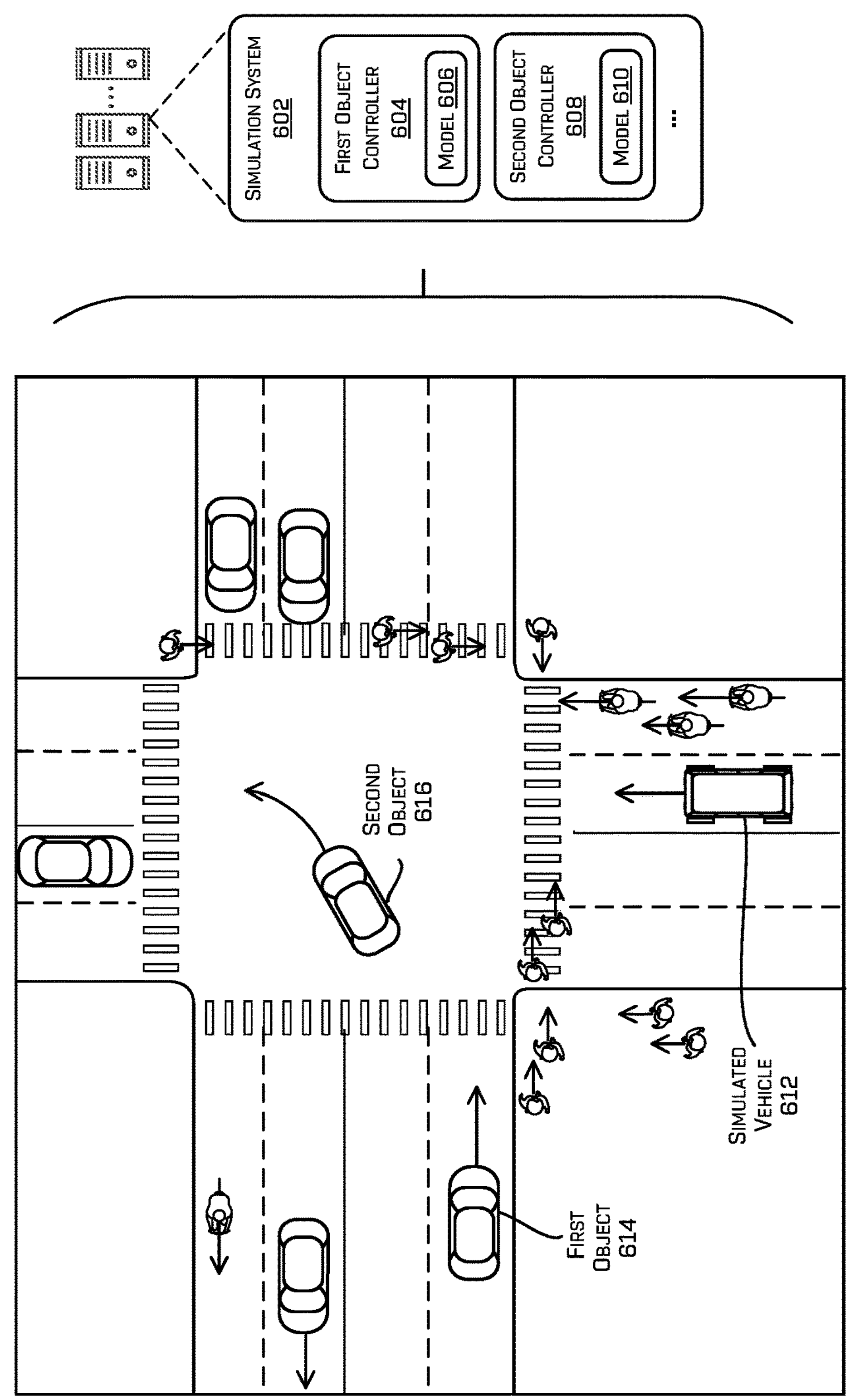
FIG. 6 depicts an example driving simulation in which a number of smart agents are controlled by object controllers using trained models, in accordance with one or more implementations of the disclosure.

FIG. 6 depicts an example driving simulation 600 in which a number of smart agents are controlled by object controllers using ML object movement models. Certain ML models trained using the various techniques described herein may include object movement models, in which continuous ranges of object movement data (e.g., velocity, steering angle, acceleration, etc.) are discretized and used as ground truth training data. Trained object movement models may receive input data corresponding to a current vehicle state, route or intended destination, nearby object data, map data, environment data, etc., and may output predicted object movement data (and/or state data) such as velocity, steering angle, acceleration, etc., for a future time step. As shown in this example, one or more trained object movement models may be used by a simulation system 602 to control smart agents within a driving simulation 600. However, in other examples, similar or identical trained models may be deployed in autonomous vehicles operating in real-world physical environments to control the movement, navigation, and/or route planning of the autonomous vehicles. Additionally, although certain examples described herein relate specifically to ML models for predicting and controlling specific types of object motion, it can be understood from the context of this disclosure that similar or identical techniques for ML model training may be applied to various other types and uses of vehicle-related and non-vehicle-related ML models (e.g., models for vehicle or pedestrian movement, position, behaviors, etc.).

As shown in this example, the simulation system 602 may include a number of object controllers (e.g., object controller 604 and object controller 608), configured to use one or more trained models (e.g., model 606 and model 610) to control the movement and operation of various smart agents during the simulation 600. In the illustrated example, a simulation 600 may be generated and executed by the simulation system 602 based on a simulation scenario. At the time step depicted in the simulation 600, a simulated vehicle 612 is controlled by an autonomous vehicle controller within the simulated environment. The simulation may be populated with additional simulated agents and other objects, which may include all playback objects, all smart agents, or a combination of playback and smart agents. In some instances, different combinations of playback objects may be converted to smart agents in different simulations, or an individual playback object may be converted to a smart agent during the course of a single simulation. For simulation 600 shown in this example, the simulated environment includes a first object 614 and a second object 616, each of which may be a vehicle smart agent. Although not shown in this example, any number of additional objects of other object types (e.g., pedestrians, bicycles, etc.) may be smart agents controlled using ML models trained using the techniques described herein.

In various examples, the simulation system 602 may use a single object controller and/or a single ML model to control multiple smart agents, or may use a combination of multiple object controllers and/or ML models. In some cases, a first model 606 may be configured to control a first type of smart agent (e.g., vehicle smart agents), a second model 610 may be configured to control a subtype of the first object type (e.g., trucks, motorcycles, etc.) or to control a second type of smart agent different from the first type (e.g., pedestrian smart agents), etc. Each object controller may use the trained models described to control the movements of the smart agents during a simulation.

In some examples, the simulation system 602 may be configured to evaluate the simulation itself and/or the performance of the ML models used to control smart agents during the simulation. For instance, based on determining whether the smart agent (e.g., first object 614) performed consistent with one or more predetermined outcomes and/or determining whether any rules were broken or assertions were triggered, the simulation system 602 can determine whether or not the simulation was successful and/or whether or not the corresponding model 606 performed adequately. Examples of such predetermined outcomes and/or rules may include determining whether a smart agent controlled by a model 606 was involved in a collision or traffic incident within the simulation, whether the smart agent committed any moving violations or high-risk driving maneuvers, etc. Additionally or alternatively, the simulation system 602 may determine metrics corresponding to performance of the object controller(s) 604 and 608, and/or for the performance of the models 606 and 610. These metrics may represent one or more differences between the movements and/or other behaviors of the smart agents in the simulated environment and the corresponding movements and/or behaviors of associated objects operating in a physical environment (e.g., based on driving log data used to train the ML models). The evaluations performed by the simulation system 602 may include evaluations of the degree of smart agent realism provided by the object controller(s) 604 and 608 executing the trained models 606 and 610, and/or may include evaluations of the efficacy of a simulation based on the degree of smart agent realism provided. The simulation system 602 also may aggregate the evaluations of simulations, object controller(s) and/or trained ML models over multiple simulations executed based on the same simulation scenario or multiple similar simulation scenarios.

Figure 7:
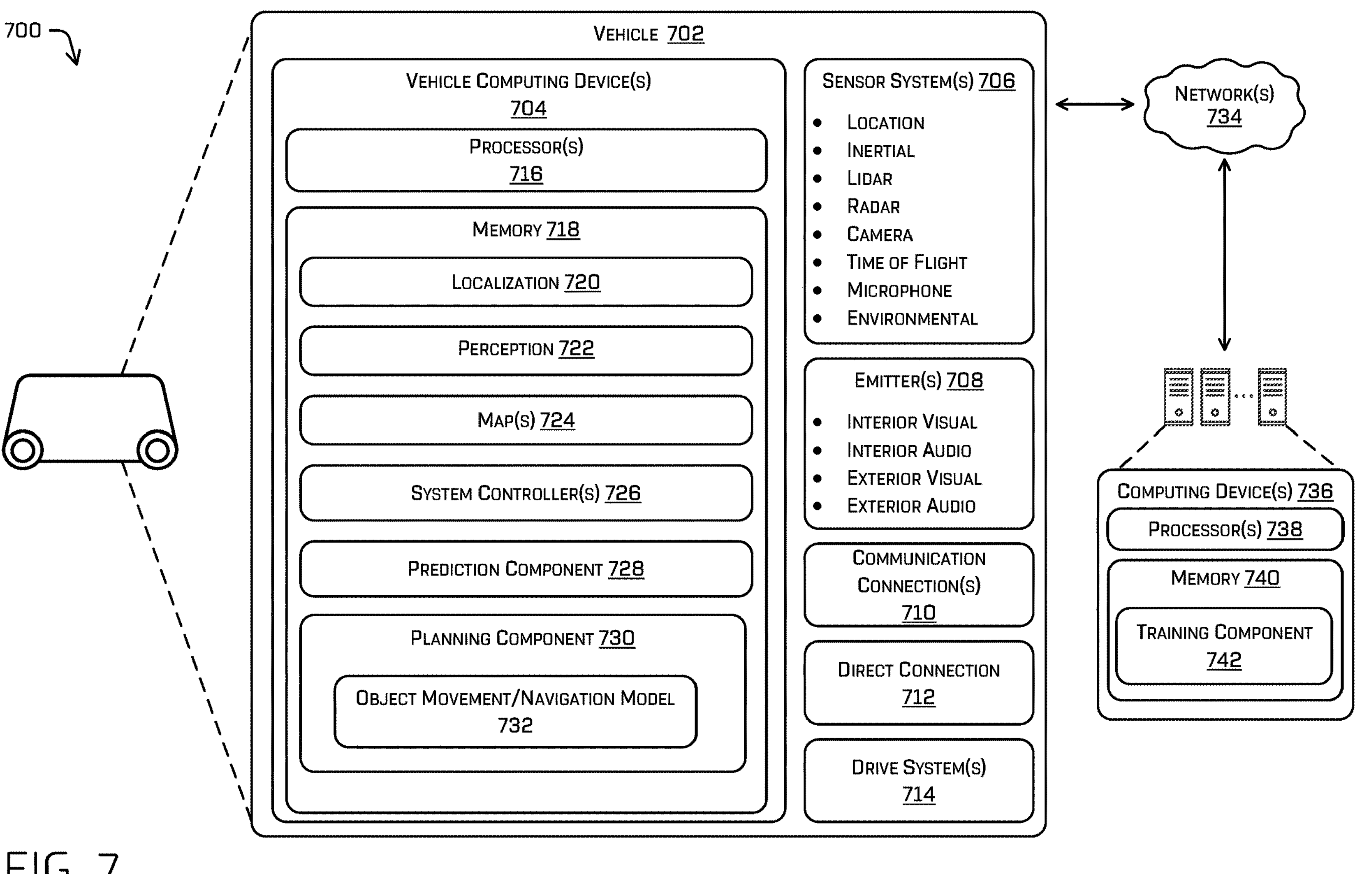
FIG. 7 is a block diagram illustrating an example system, including a vehicle and a separate machine learning model training system, for implementing various techniques described herein.

FIG. 7 depicts a block diagram of an example system 700 for implementing various techniques described herein. The system 700 can include a vehicle 702, which can correspond to vehicle 108 of FIG. 1, simulated vehicle 612 of FIG. 6, and/or other any autonomous or semi-autonomous vehicle described herein. The vehicle 702 configured to perform various techniques and examples of training ML models used to control the movement, navigation, and/or route-planning of real and/or simulated vehicles. In this example, the vehicle 702 may represent a vehicle from which ground truth object movement data is received, and/or a vehicle on which a trained ML model is deployed and used to control the vehicle navigation to traverse the environment safely and efficiently.

The vehicle 702 in this example may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all navigation and parking functions, it may or may not include a driver and/or controls for driving the vehicle 702, such as a steering wheel, an acceleration pedal, and/or a brake pedal. In the illustrated example, the vehicle 702 is an autonomous vehicle; however, the vehicle 702 could be any other type of vehicle or robotic platform. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 702 can include vehicle computing device(s) 704, one or more sensor systems 706, one or more emitters

708, one or more communication connections 710, at least one direct connection 712, and one or more drive systems 714. The vehicle computing device(s) 704 also can include one or more processors 716 and memory 718 communicatively coupled with the one or more processors 716. In the illustrated example, the memory 718 of the vehicle computing device(s) 704 stores a localization component 720, a perception component 722, one or more maps 724, one or more system controllers 726, a prediction component 728, and a planning component 730 comprising object movement and/or navigation model 732. Though depicted in FIG. 7 as residing in the memory 718 for illustrative purposes, it is contemplated that the localization component 720, the perception component 722, the one or more maps 724, the one or more system controllers 726, the prediction component 728, the planning component 730, and/or the object movement and/or navigation model 732 can additionally, or alternatively, be accessible to the vehicle 702 (e.g., stored on, or otherwise accessible by, computing device(s) 736 and/or other memory remote from the vehicle 702).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for determining that an object is proximate to one or more crosswalk regions and/or for identifying candidate reference lines, as discussed herein.

In some instances, and in general, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, stoplight, stop sign, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 724 can include at least one map (e.g., images and/or a mesh).

In some examples, the vehicle 702 can be controlled based at least in part on the maps 724. That is, the maps 724 can be used in connection with the localization component 720, the perception component 722, the prediction component 728, and/or the planning component 730 to determine a location of the vehicle 702, identify objects in an environment, and/or generate routes and/or trajectories to navigate within an environment.

In some examples, the one or more maps 724 can be stored on a remote computing device(s) (such as the computing device(s) 736) accessible via network(s) 734. In some examples, multiple maps 724 can be stored based on, for example, a characteristic (e.g., type of entity, time of day, day of week, season of the year, etc.). Storing multiple maps 724 can have similar memory requirements, but can increase the speed at which data in a map can be accessed.

In at least one example, the vehicle computing device(s) 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

In general, the prediction component 728 can include functionality to generate predicted information associated with objects in an environment. As an example, the prediction component 728 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 728 can generate one or more predicted positions, predicted velocities, predicted trajectories, etc., for such target objects based on attributes of the target object and/or other objects proximate the target object.

In general, the planning component 730 can determine a path for the vehicle 702 to follow to traverse the environment. For example, the planning component 730 can determine various routes and trajectories and various levels of detail. For example, the planning component 730 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 730 can generate an instruction for guiding the autonomous vehicle along at least a portion of the route from the first location to the second location. In at least one example, the planning component 730 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some instances, the planning component 730 can generate one or more trajectories for the vehicle 702 based at least in part on predicted trajectories and/or location(s) associated with object(s) in an environment. In some examples, the planning component 730 can use temporal logic, such as linear temporal logic and/or signal temporal logic, to evaluate one or more trajectories of the vehicle 702.

As discussed above, the planning component 730 may use one or more trained models, including object movement and/or navigation model 732, to control object movements and/or other behaviors. The object movement and/or navigation model 732 may be similar or identical to the ML model 132, ML model 306, and/or ML models 606 and 610 discussed in connection with the above examples. The object movement and/or navigation model 732 may be configured to receive input data including any or all current state data of the vehicle 702, perceived object data and attributes of any other agents or static objects in the environment of the vehicle 702 (e.g., object classifications, locations, poses, velocities, accelerations, etc.), the attributes of the current driving environment of the vehicle 702 (e.g., map data, road network data, weather and driving conditions, etc.), and the destination or route that the vehicle 702 intends to follow within the environment. Based on the inputs, the object movement and/or navigation model 732 may output movement data (e.g., velocities, accelerations, and/or steering angles) for a vehicle or object to perform at the next time step.

As can be understood, the components discussed herein (e.g., the localization component 720, the perception component 722, the one or more maps 724, the one or more system controllers 726, the prediction component 728, and the planning component 730 are described as divided for illustrative purposes. However, the operations performed by the various components can be combined or performed in any other component. Further, any of the components discussed as being implemented in software can be implemented in hardware, and vice versa. Further, any functionality implemented in the vehicle 702 can be implemented in the computing device(s) 736, or another component (and vice versa).

In at least one example, the sensor system(s) 706 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the time of flight sensors can include individual time of flight sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more networks 734, to the one or more computing device(s) 736 at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 734. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the one or more maps 724, the one or more system controllers 726, the prediction component 728, and the planning component 730 can process sensor data, as described above, and can send their respective outputs, over the one or more network(s) 734, to one or more computing device(s) 736. In at least one example, the localization component 720, the one or more maps 724, the one or more system controllers 726, the prediction component 728, and the planning component 730 can send their respective outputs to the one or more computing device(s) 736 at a particular frequency, after a lapse of a predetermined period of time, in near real-time, etc.

In some examples, the vehicle 702 can send sensor data to one or more computing device(s) 736 via the network(s) 734. In some examples, the vehicle 702 can send raw sensor data to the computing device(s) 736. In other examples, the vehicle 702 can send processed sensor data and/or representations of sensor data to the computing device(s) 736. In some examples, the vehicle 702 can send sensor data to the computing device(s) 736 at a particular frequency, after a lapse of a predetermined period of time, in near real-time, etc. In some cases, the vehicle 702 can send sensor data (raw or processed) to the computing device(s) 736 as one or more log files.

The computing device(s) 736 can include processor(s) 738 and a memory 740 storing a training component 742.

In some instances, the training component 742 can include functionality to train one or more ML models to predict and/or control object movements, as discussed herein. In some instances, the training component 742 can communicate information generated by the one or more models to the vehicle computing device(s) 704 to revise how to control the vehicle 702 in response to different situations. For example, the training component 742 can train one or more of the object movement and/or navigation models 732 discussed herein. In some examples, the training component 742 can include functionality to search data logs and receive vehicle log data corresponding to particular scenarios (e.g., a pedestrian or other dynamic object traversing an off-route environment, a construction zone, or an accident scene, etc.) for training data. The training data can be input to a machine learning model where a known result (e.g., a ground truth, such as the known "future" attributes) can be used to adjust weights and/or parameters of the machine learning model to minimize an error.

For instance, aspects of some or all of the components discussed herein can include any models, algorithms, and/or machine learned algorithms. For example, in some instances, the components in the memory 740 (and the memory 718, discussed above) can be implemented as a neural network. In some examples, the training component 742 can utilize a neural network to generate and/or execute one or more models to determine segmentation information from sensor data, as discussed herein.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 716 of the vehicle 702 and the processor(s) 738 of the computing device(s) 736 can be any suitable processor capable of executing instructions to process data and perform operations as described herein. By way of example and not limitation, the processor(s) 716 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and memory 740 are examples of non-transitory computer-readable media. The memory 718 and memory 740 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 736 and/or components of the computing device(s) 736 can be associated with the vehicle 702. That is, the vehicle 702 can perform one or more of the functions associated with the computing device(s) 736, and vice versa.

Figure 8:
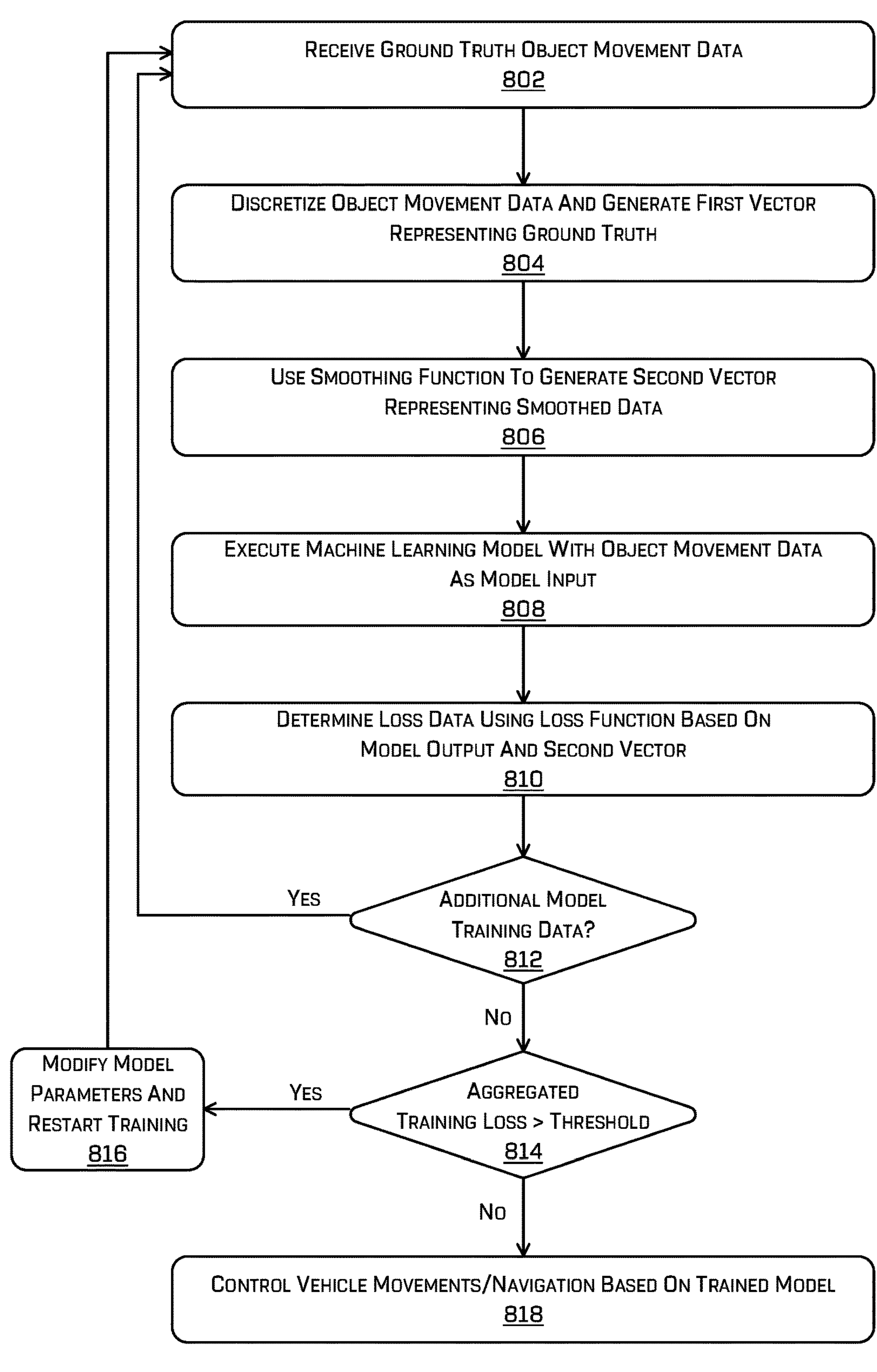
FIG. 8 is a flow diagram illustrating an example process for training a machine learning model configured to control the movement and/or navigation of an autonomous vehicle, in accordance with one or more implementations of the disclosure.

FIG. 8 is a flow diagram illustrating an example process 800 for training a machine learning model configured to control the movement and/or navigation of an autonomous vehicle. In some examples, the operations of process 800 may be performed by a model training component, such as the training component 102, alone or in conjunction with one or more components of an autonomous vehicle (e.g., a planning component 730).

At operation 802, the training component 102 may receive ground truth object movement data to be used as training data for one or more ML models. In some examples, the ground truth data received in operation 802 may be based on log data captured by the sensors of one or more real-world vehicles and/or determining using other algorithms which may use more intensive computational resources. The data may include any movement or operational data associated with the vehicles themselves and/or other objects in the environment.

At operation 804, the training component 102 may discretize the object movement data received in operation 802, and may generate a first vector representation of the ground truth data. As described above, the training component 102 may use one-hot encoding or a similar encoding scheme in which the ground truth object movement value is stored as a binary vector storing a value at the labeled bin corresponding to the ground truth data.

At operation 806, the training component 102 may use a smoothing function generate a smoothed second vector based on the discretized ground truth data in the first vector. In some examples, the training component 102 may use a Gaussian quadrature smoothing function or other similar weight sum function to determine a set of values for the vector components of the smoothed vector. The smoothing function may be centered on the labeled bin containing the ground truth data with decreasing values that move out in both directions from the ground truth labeled bin, to generate the second vector with a wider distribution that represents the same ground truth data.

At operation 808, the training component 102 may commence training by executing the ML model using the ground truth data received in operation 802 as input to the ML model. The ML model may be executed using a current set of model parameters that may be determined randomly and/or tuned algorithmically during the model training process. As discussed above, the output of the ML model may be an object movement prediction, and may be represented in a vector form similar or identical to the first and second vectors.

At operation 810, the training component 102 may execute a loss function to determine loss data associated with the prediction output by the ML model in operation 808. In some examples, the training component 102 may use a cross-entropy loss function to compare the model prediction (e.g., a first distribution) output by the model to the second vector (e.g., a second distribution) storing the smoothed ground truth data. As described above, by smoothing the discretized ground truth data using the techniques described herein, the loss penalties for incorrect predictions that are closer to the ground truth data may be reduced in magnitude. As a result, machine learning models trained using these techniques may provide improved performance for controlling object movements and navigation.

At operation 812, the training component 102 may determine whether the training data set includes additional training data. As described above, the training component 102 may use any amount of training data during a training process for an ML model. Each training data in the training data set may be run against the ML model, and the loss for each training data may be averaged or aggregated to determine the overall performance of the ML model for the training data set. When the training component 102 determines that there is additional training data to be run in the training data set (812: Yes), process 800 may return to operation 802 to retrieve and run the additional training data.

When the training data set has completed (812: No), the process 800 may proceed to operation 814 to combine the loss (e.g., aggregate, average, ore compute a loss value based on a loss formula/algorithm) over the training data set. When the overall loss calculated for the training data set meets or exceed a loss threshold (814: Yes), the training component 102 may proceed to operation 816 to modify the parameters of the ML model (e.g., using backpropagation) and rerun the training data set. Alternatively, when the training component 102 determines a sufficiently low overall loss for the training data set (814: No), then in operation 818 the training component may save the trained model with the current model parameters and use the trained model to control simulated and/or real-world vehicles. For example, the training component 102 may transmit the trained ML model to one or more vehicles (e.g., real-world autonomous vehicles) to control the operation of the vehicles in driving environments, and/or to one or more simulation systems to control the operation of simulated smart agents during driving simulations.

EXAMPLE CLAUSES

A. A system comprising: one or more processors; and one or more computer-readable media storing computer-executable instructions that, when executed, cause the one or more processors to perform operations comprising: receiving data associated with operation of a vehicle in an environment; determining, based at least in part on the data, a motion value associated with motion of a first object proximate the vehicle; generating, based at least in part on the motion value, a vector having a first non-zero value associated with a first component of the vector having a range of values within which the motion value falls; generating, based at least in part on the vector, a smoothed vector having a second non-zero value associated with a second component proximate the first component; providing at least a portion of the data as input to a machine learning model configured to output object movement data; receiving an output of the machine learning model; determining a loss value based at least in part on a comparison between the smoothed vector and the output of the machine learning model; training the machine learning model based at least in part on the loss value, to determine a trained machine learning model; and executing a driving simulation, wherein the driving simulation includes a simulated vehicle controlled in a simulated environment by a vehicle controller based at least in part on the trained machine learning model.

B. The system of paragraph A, wherein generating the smoothed vector comprises: determining, based at least in part on a Gaussian quadrature function, a first value and a second value; assigning the first value to the second component of the smoothed vector, wherein the second component is at a first location within the smoothed vector corresponding to a location of the first component in the vector; and assigning the second value to a third component of the smoothed vector, wherein the third component is adjacent to the second component within the smoothed vector.

C. The system of paragraph A, wherein generating the smoothed vector comprises: determining, based at least in part on a smoothing function, a first value, a second value, and third value, wherein the first value is greater than the second value, and wherein the second value is greater than the third value; assigning the first value to the second component of the smoothed vector, wherein the second component is at a location within the smoothed vector corresponding to a location of the first component in the vector; assigning the second value to a third component of the smoothed vector, wherein the third component is adjacent to the second component within the smoothed vector; and assigning the third value to a fourth component of the smoothed vector, wherein the fourth component is adjacent to the third component within the smoothed vector.

D. The system of paragraph A, wherein the output of the machine learning model includes a first probability distribution, wherein the smoothed vector includes a second probability distribution, and wherein determining the loss value comprises: comparing, using a cross-entropy loss function, the first probability distribution and the second probability distribution.

E. The system of paragraph A, wherein generating the smoothed vector includes: determining a first numeric sum of components of the vector; and determining, based at least in part on a smoothing function, a distribution of values, wherein a second numeric sum of the distribution of values equals the first numeric sum.

F. A method comprising: receiving data associated with operation of a vehicle moving through an environment; determining, based at least in part on the data, a motion value associated with an object; generating a first vector representative of the motion value and having a single non-zero value for a vector component associated with a range of values in which the motion value falls; generating, based at least in part on the first vector and a smoothing function, a second vector; providing at least a portion of the data as input to a machine learning model configured to output object movement data; receiving an output of the machine learning model; determining a loss value based at least in part on a comparison between the second vector and the output of the machine learning model; training the machine learning model based at least in part on the loss value, to determine a trained machine learning model; and transmitting the trained model to a second vehicle configured to be controlled based at least in part on the trained machine learning model.

G. The method of paragraph F, wherein generating the second vector comprises: determining, based at least in part on a Gaussian quadrature function, a first value and a second value; assigning the first value to a first vector component of the second vector, wherein the first vector component is at a first location within the second vector corresponding to a location of the vector component in the first vector; and assigning the second value to a second vector component of the second vector, wherein the second vector component is adjacent to the first vector component within the second vector.

H. The method of paragraph F, wherein the first vector comprises a binary vector, and wherein the second vector comprises a non-binary.

I. The method of paragraph F, wherein generating the second vector comprises: determining, based at least in part on the smoothing function, a first value, a second value, and third value, wherein the first value is greater than the second value, and wherein the second value is greater than the third value; assigning the first value to a first vector component of the second vector, wherein the first vector component is at a first location within the second vector corresponding to a location of the vector component in the first vector; assigning the second value to a second vector component of the second vector, wherein the second vector component is adjacent to the first vector component within the second vector; and assigning the third value to a third vector component of the second vector, wherein the third vector component is adjacent to the second vector component within the second vector.

J. The method of paragraph F, wherein the output of the machine learning model includes a first probability distribution, wherein the second vector includes a second probability distribution, and wherein determining the loss value comprises: comparing, using a cross-entropy loss function, the first probability distribution and the second probability distribution.

K. The method of paragraph F, wherein generating the second vector includes: determining a first numeric sum of components of the first vector; and determining, based at least in part on the smoothing function, a distribution of values, wherein a second numeric sum of the distribution of values equals the first numeric sum.

L. The method of paragraph F, wherein the motion value represents at least one of a recorded speed of the object or a recorded steering angle of the object.

M. The method of paragraph F, wherein the second vehicle includes a simulated smart agent in a driving simulation, and wherein the method further comprises: executing the driving simulation, wherein the driving simulation includes a first simulated vehicle controlled in a simulated environment by a first vehicle controller, and the second vehicle controlled by a second vehicle controller different from the first vehicle controller, wherein the second vehicle controller includes the trained machine learning model.

N. One or more non transitory computer readable media storing instructions executable by a processor, wherein the instructions, when executed, cause the processor to perform operations comprising: receiving data associated with operation of a vehicle moving through an environment; determining, based at least in part on the data, a motion value associated with an object; generating a first vector representative of the motion value and having a single non-zero value for a vector component associated with a range of values in which the motion value falls; generating, based at least in part on the first vector and a smoothing function, a second vector; providing at least a portion of the data as input to a machine learning model configured to output object movement data; receiving an output of the machine learning model; determining a loss value based at least in part on a comparison between the second vector and the output of the machine learning model; training the machine learning model based at least in part on the loss value, to determine a trained machine learning model; and transmitting the trained model to a second vehicle configured to be controlled based at least in part on the trained machine learning model.

O. The one or more non transitory computer readable media of paragraph N, wherein generating the second vector comprises: determining, based at least in part on a Gaussian quadrature function, a first value and a second value; assigning the first value to a first vector component of the second vector, wherein the first vector component is at a first location within the second vector corresponding to a location of the vector component in the first vector; and assigning the second value to a second vector component of the second vector, wherein the second vector component is adjacent to the first vector component within the second vector.

P. The one or more non transitory computer readable media of paragraph N, wherein the first vector comprises a binary vector, and wherein the second vector comprises a non-binary.

Q. The one or more non transitory computer readable media of paragraph N, wherein generating the second vector comprises: determining, based at least in part on the smoothing function, a first value, a second value, and third value, wherein the first value is greater than the second value, and wherein the second value is greater than the third value; assigning the first value to a first vector component of the second vector, wherein the first vector component is at a first location within the second vector corresponding to a location of the vector component in the first vector; assigning the second value to a second vector component of the second vector, wherein the second vector component is adjacent to the first vector component within the second vector; and assigning the third value to a third vector component of the second vector, wherein the third vector component is adjacent to the second vector component within the second vector.

R. The one or more non transitory computer readable media of paragraph N, wherein the output of the machine learning model includes a first probability distribution, wherein the second vector includes a second probability distribution, and wherein determining the loss value comprises: comparing, using a cross-entropy loss function, the first probability distribution and the second probability distribution.

S. The one or more non transitory computer readable media of paragraph N, wherein generating the second vector includes: determining a first numeric sum of components of the first vector; and determining, based at least in part on the smoothing function, a distribution of values, wherein a second numeric sum of the distribution of values equals the first numeric sum.

T. The one or more non transitory computer readable media of paragraph N, wherein the motion value represents at least one of a recorded speed of the object or a recorded steering angle of the object.

While the example clauses described above are described with respect to particular implementations, it should be understood that, in the context of this document, the content of the example clauses can be implemented via a method, device, system, a computer-readable medium, and/or another implementation. Additionally, any of examples A-t may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more computer-readable media storing computer-executable instructions that, when executed, cause the one or more processors to perform operations comprising:

receiving first vehicle movement data associated with operation of a vehicle in an environment, wherein the first vehicle movement data is within a continuous range of vehicle movement values;

generating a one-hot encoded vector representative of the first vehicle movement data, the one-hot encoded vector comprising a first plurality of binary elements, wherein an element of the first plurality of binary elements is associated with one of a plurality of sub-ranges of the continuous range of vehicle movement values, wherein generating the one-hot encoded vector comprises:

determining a first sub-range of the continuous range of vehicle movement values that includes the first vehicle movement data;

setting, to a non-zero value, a first element of the one-hot encoded vector corresponding to the first sub-range; and setting, to a zero value, an additional element in the one-hot encoded vector;

generating, based at least in part on applying a smoothing function to the one-hot encoded vector, a smoothed vector representative of the first vehicle movement data, wherein generating the smoothed vector comprises:

setting, to a non-zero value, a first element of the smoothed vector corresponding to the first sub-range; and setting, to a non-zero value, a second element of the smoothed vector corresponding to a second sub-range of the continuous range of vehicle movement values that excludes the first vehicle movement data;

training, using the smoothed vector as ground truth motion data, an object motion machine learning model, to determine a trained object motion model; and executing a driving simulation, wherein the driving simulation includes a simulated vehicle controlled in a simulated environment by a vehicle controller based at least in part on the trained object motion model.

2. The system of claim 1, wherein generating the smoothed vector comprises:

determining, based at least in part on a Gaussian quadrature function, a first value and a second value;

assigning the first value to the first element of the smoothed vector; and assigning the second value to the second element of the smoothed vector.

3. The system of claim 1, wherein generating the smoothed vector comprises:

determining, based at least in part on the smoothing function, a first value, a second value, and third value, wherein the first value is greater than the second value, and wherein the second value is greater than the third value;

assigning the first value to the first element of the smoothed vector;

assigning the second value to the second element of the smoothed vector, wherein the second element is adjacent to the first element within the smoothed vector; and assigning the third value to a third element of the smoothed vector, wherein the third element is adjacent to the second element within the smoothed vector.

4. The system of claim 1, wherein the object motion machine learning model is configured to output a first probability distribution, wherein the smoothed vector includes a second probability distribution, and wherein training the object motion machine learning model comprises:

comparing, using a cross-entropy loss function, the first probability distribution and the second probability distribution.

5. The system of claim 1, wherein generating the smoothed vector includes:

determining a first numeric sum of components of the one-hot encoded vector; and determining, based at least in part on the smoothing function, a distribution of values, wherein a second numeric sum of the distribution of values equals the first numeric sum.

6. A method comprising:

receiving first vehicle movement data associated with operation of a vehicle in an environment, wherein the first vehicle movement data is within a continuous range of vehicle movement values;

generating a one-hot encoded vector representative of the first vehicle movement data the one-hot encoded vector comprising a first plurality of elements, wherein an element of the first plurality of elements is associated with one of a plurality of different sub-ranges of the continuous range of vehicle movement values, wherein generating the one-hot encoded vector comprises:

determining a first sub-range of the continuous range of vehicle movement values that includes the first vehicle movement data;

setting, to a non-zero value, a first element of the one-hot encoded vector corresponding to the first sub-range; and setting, to a zero value, remaining elements in the one-hot encoded vector;

generating, based at least in part on applying a smoothing function to the one-hot encoded and, a smoothed vector representative of the first vehicle movement data, wherein generating the smoothed vector comprises:

setting, to a non-zero value, a first element of the smoothed vector corresponding to the first sub-range; and setting, to a non-zero value, a second element of the smoothed vector corresponding to a second sub-range of the continuous range of vehicle movement values that excludes the first vehicle movement data;

training, using the smoothed vector as ground truth motion data, an object motion machine learning model, to determine a trained object motion model; and controlling a second vehicle based at least in part on the trained object motion model.

7. The method of claim 6, wherein generating the smoothed vector comprises:

determining, based at least in part on a Gaussian quadrature function, a first value and a second value;

assigning the first value to the first element of the smoothed vector; and assigning the second value to the second element of the smoothed vector.

8. The method of claim 6, wherein generating the smoothed vector comprises:

determining, based at least in part on the smoothing function, a first value, a second value, and third value, wherein the first value is greater than the second value, and wherein the second value is greater than the third value;

assigning the first value to the first element of the smoothed vector;

assigning the second value to the second element of the smoothed vector, wherein the second element is adjacent to the first element within the smoothed vector; and assigning the third value to a third element of the smoothed vector, wherein the third element is adjacent to the second element within the smoothed vector.

9. The method of claim 6, wherein the object motion machine learning model is configured to output a first probability distribution, wherein the smoothed vector includes a second probability distribution, and wherein training the object motion machine learning model comprises:

comparing, using a cross-entropy loss function, the first probability distribution and the second probability distribution.

10. The method of claim 6, wherein generating the smoothed vector includes:

determining a first numeric sum of components of the one-hot encoded vector; and determining, based at least in part on the smoothing function, a distribution of values, wherein a second numeric sum of the distribution of values equals the first numeric sum.

11. The method of claim 6, wherein the first vehicle movement data represents at least one of a recorded speed of the vehicle or a recorded steering angle of the vehicle.

12. The method of claim 6, wherein the second vehicle comprises a simulated smart agent in a driving simulation, and wherein the method further comprises:

executing the driving simulation, wherein the driving simulation includes a first simulated vehicle controlled in a simulated environment by a first vehicle controller, and the second vehicle controlled by a second vehicle controller different from the first vehicle controller, wherein the second vehicle controller includes the trained object motion model.

13. One or more non-transitory computer-readable media storing instructions executable by a processor, wherein the instructions, when executed, cause the processor to perform operations comprising:

receiving first vehicle movement data associated with operation of a vehicle in an environment, wherein the first vehicle movement data is within a continuous range of vehicle movement values;

generating a one-hot encoded vector representative of the first vehicle movement data the one-hot encoded vector; comprising a first plurality of elements, wherein an element of the first plurality of elements is associated with one of a plurality of sub-ranges of the continuous range of vehicle movement values, wherein generating the one-hot encoded vector comprises:

determining a first sub-range of the continuous range of vehicle movement values that includes the first vehicle movement data;

setting, to a non-zero value, a first element of the one-hot encoded vector corresponding to the first sub-range; and setting, to a zero value, remaining elements in the one-hot encoded vector;

generating, based at least in part on applying a smoothing function to the one-hot encoded vector, a smoothed vector representative of the first vehicle movement data, wherein generating the smoothed vector comprises:

setting, to a non-zero value, a first element of the smoothed vector corresponding to the first sub-range; and setting, to a non-zero value, a second element of the smoothed vector corresponding to a second sub-range of the continuous range of vehicle movement values that excludes the first vehicle movement data;

training, using the smoothed vector as ground truth motion data, an object motion machine learning model, to determine a trained object motion model; and controlling a second vehicle based at least in part on the trained object motion model.

14. The one or more non-transitory computer-readable media of claim 13, wherein generating the smoothed vector comprises:

determining, based at least in part on a Gaussian quadrature function, a first value and a second value;

assigning the first value to the first element of the smoothed vector; and assigning the second value to the second element of the smoothed vector.

15. The one or more non-transitory computer-readable media of claim 13, wherein generating the smoothed vector comprises:

determining, based at least in part on the smoothing function, a first value, a second value, and third value, wherein the first value is greater than the second value, and wherein the second value is greater than the third value;

assigning the first value to the first element of the smoothed vector;

assigning the second value to the second element of the smoothed vector, wherein the second element is adjacent to the first element within the smoothed vector; and assigning the third value to a third element of the smoothed vector, wherein the third element is adjacent to the second element within the smoothed vector.

16. The one or more non-transitory computer-readable media of claim 13, wherein the object motion machine learning model is configured to output a first probability distribution, wherein the smoothed vector includes a second probability distribution, and wherein training the object motion machine learning model comprises:

comparing, using a cross-entropy loss function, the first probability distribution and the second probability distribution.

17. The one or more non-transitory computer-readable media of claim 13, wherein generating the smoothed vector includes:

determining a first numeric sum of components of the one-hot encoded vector; and determining, based at least in part on the smoothing function, a distribution of values, wherein a second numeric sum of the distribution of values equals the first numeric sum.

18. The one or more non-transitory computer-readable media of claim 13, wherein the first vehicle movement data represents at least one of a recorded speed of the vehicle or a recorded steering angle of the vehicle.

19. The method of claim 6, wherein generating the one-hot encoded vector comprises:

classifying the first vehicle movement data into a first bin of a fixed-sized plurality of bins, wherein each of the plurality of bins is associated with a unique sub-range within the continuous range of vehicle movement values; and generating the one-hot encoded vector as a vector having a number of vector components equal to the fixed-sized, and assigning the first non-zero value to the first element in the one-hot encoded vector corresponding to the first bin.

20. The method of claim 6, further comprising:

receiving second vehicle movement data associated with the operation of the vehicle, wherein the first vehicle movement data represents a velocity of the vehicle at a first time and the second vehicle movement data represents a steering angle of the vehicle at the first time;

generating a second one-hot encoded vector representative of the second vehicle movement data; and generating, based at least in part on the second one-hot encoded vector and using the smoothing function, a second smoothed vector representative of the second vehicle movement data, wherein the trained object motion model is trained based on the smoothed vector and the second smoothed vector.

* * * * *